US010346895B2

(12) United States Patent
Stoll et al.

(10) Patent No.: US 10,346,895 B2
(45) Date of Patent: Jul. 9, 2019

(54) INITIATION OF PURCHASE TRANSACTION IN RESPONSE TO A REPLY TO A RECOMMENDATION

(71) Applicant: Wal-Mart Stores, Inc., Bentonville, AR (US)

(72) Inventors: Nathan Stoll, San Francisco, CA (US); Andrew Mark Ellerhorst, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 50 days.

(21) Appl. No.: 14/708,069

(22) Filed: May 8, 2015

(65) Prior Publication Data

US 2015/0242931 A1 Aug. 27, 2015

Related U.S. Application Data

(63) Continuation-in-part of application No. 13/986,606, filed on May 16, 2013, now abandoned, and a (Continued)

(51) Int. Cl.
*H04W 4/21* (2018.01)
*G06Q 30/02* (2012.01)
(Continued)

(52) U.S. Cl.
CPC ..... *G06Q 30/0631* (2013.01); *G06Q 30/0214* (2013.01); *G06Q 30/0635* (2013.01);
(Continued)

(58) Field of Classification Search
CPC .... G06Q 30/0214; G06Q 30/06; G06Q 50/01; G06Q 30/0641; H04W 4/21; H04L 51/32
(Continued)

(56) References Cited

U.S. PATENT DOCUMENTS 5,550,576 A 8/1996 Klosterman
5,983,004 A 11/1999 Shaw et al.
(Continued)

FOREIGN PATENT DOCUMENTS

JP 2004326634 11/2004
JP 2007249833 9/2007
(Continued)

OTHER PUBLICATIONS

Kuo-Lun Hsiao, Lin, J. C., Xiang-Ying, W., Hsi-Peng, L., & Yu, H. (2010). Antecedents and consequences of trust in online product recommendations. Online Information Review, 34(6), 935-953.*
(Continued)

*Primary Examiner* — Michael Misiaszek
*Assistant Examiner* — Latasha D Ramphal
(74) *Attorney, Agent, or Firm* — Bryan Cave Leighton Paisner LLP

(57) ABSTRACT

In one embodiments, initiation of purchase transaction in response to a reply to a recommendation comprises a method. The method comprises, at a computer system having one or more processors and non-transitory memory storing one or more programs for execution by the one or more processors, detecting a recommendation associated with a first user, the recommendation associated with a product or service. The method further comprises detecting a response from a second user to the recommendation, determining whether the response from the second user comprises a purchase decision, and in accordance with a determination that the response from the second user comprises the purchase decision, initiating a transaction for the second user to purchase the product or service associated with the recommendation. Other embodiments are described herein.

20 Claims, 10 Drawing Sheets

Related U.S. Application Data continuation-in-part of application No. 13/986,607, filed on May 16, 2013, now Pat. No. 9,875,483, and a continuation-in-part of application No. 13/986,608, filed on May 16, 2013, now abandoned, and a continuation-in-part of application No. 13/896,310, filed on May 16, 2013, now Pat. No. 9,799,046, and a continuation-in-part of application No. 13/986,612, filed on May 16, 2013, and a continuation-in-part of application No. 13/896,318, filed on May 16, 2013, now abandoned, and a continuation-in-part of application No. 13/896,292, filed on May 16, 2013, and a continuation-in-part of application No. 13/769,181, filed on Feb. 15, 2013, now abandoned.

(60) Provisional application No. 61/990,575, filed on May 8, 2014, provisional application No. 61/648,566, filed on May 17, 2012, provisional application No. 61/648,569, filed on May 17, 2012, provisional application No. 61/648,582, filed on May 17, 2012, provisional application No. 61/648,588, filed on May 17, 2012, provisional application No. 61/648,591, filed on May 17, 2012, provisional application No. 61/648,564, filed on May 17, 2012, provisional application No. 61/648,578, filed on May 17, 2012.

(51) Int. Cl.
*G06Q 30/06* (2012.01)
*G06Q 50/00* (2012.01)
*H04L 12/58* (2006.01)

(52) U.S. Cl.
CPC ......... *G06Q 30/0641* (2013.01); *G06Q 50/01* (2013.01); *H04W 4/21* (2018.02); *H04L 51/32* (2013.01)

(58) Field of Classification Search
USPC ................................ 705/64, 30, 238, 26–27
See application file for complete search history.

(56) References Cited

U.S. PATENT DOCUMENTS 6,185,221 B1 2/2001 Aybay
6,370,381 B1 4/2002 Minnick
6,487,390 B1 11/2002 Virine
6,912,588 B1 6/2005 Jardin
7,092,381 B2 8/2006 Carlsson et al.
7,302,429 B1 11/2007 Wanker
7,330,895 B1 2/2008 Horvitz
7,797,196 B1 9/2010 Aaron et al.
7,831,439 B1 11/2010 Bryar et al.
7,925,542 B2 4/2011 Shah
8,064,342 B2 11/2011 Badger
8,095,521 B2 1/2012 Chan et al.
8,170,897 B1 5/2012 Cohen et al.
8,181,232 B2 5/2012 Grandcolas
8,224,823 B1 7/2012 Amacker
8,407,765 B2 3/2013 Wiley et al.
8,612,208 B2 12/2013 Cooper
8,626,604 B1 1/2014 Gandhi
8,635,227 B2* 1/2014 Sankhla ........... G06F 17/30699 707/741
8,739,016 B1 5/2014 Goldman et al.
8,775,529 B2 7/2014 Wright et al.
8,935,192 B1 1/2015 Ventilla et al.
8,976,665 B2 3/2015 Wiley et al.
9,094,257 B2 7/2015 Morrill et al.
9,184,898 B2 11/2015 Love et al.
9,264,329 B2* 2/2016 Chrapko ................ H04L 41/12
2001/0011235 A1 8/2001 Kim et al.
2001/0016496 A1 8/2001 Lee
2002/0052752 A1 5/2002 Landesmann
2002/0078138 A1 6/2002 Huang
2002/0087704 A1 7/2002 Chesnais et al.
2002/0099653 A1 7/2002 De Souza et al.
2002/0120581 A1 8/2002 Schiavone
2002/0188947 A1 12/2002 Wang
2003/0046173 A1 3/2003 Benjier
2003/0054827 A1 3/2003 Schmidl et al.
2003/0056216 A1 3/2003 Wugofski et al.
2003/0074253 A1 4/2003 Scheuring et al.
2003/0149580 A1 8/2003 Moores
2003/0188252 A1 10/2003 Kim et al.
2003/0127291 A1 11/2003 Schramm-Apple et al.
2004/0111374 A1* 6/2004 Goldstein ............ G06Q 20/027 705/64
2004/0117482 A1 6/2004 Salazar
2004/0117860 A1 6/2004 Yi et al.
2005/0004837 A1 1/2005 Sweeney et al.
2005/0086694 A1 4/2005 Hicks et al.
2005/0187883 A1 8/2005 Bishop
2005/0216144 A1 9/2005 Baldassa
2006/0047598 A1 3/2006 Hansen
2006/0277591 A1 12/2006 Arnold et al.
2007/0043583 A1 2/2007 Davulcu et al.
2007/0143816 A1 6/2007 Gupta et al.
2007/0199019 A1 8/2007 Angiolillo et al.
2007/0219880 A1 9/2007 Stone et al.
2007/0239552 A1 10/2007 Sundaresan
2007/0266097 A1 11/2007 Harik et al.
2008/0065445 A1 3/2008 Livesay et al.
2008/0177763 A1 7/2008 Lang et al.
2008/0271080 A1 10/2008 Gossweiler et al.
2008/0300940 A1 12/2008 Aravamudan
2009/0013053 A1 1/2009 Wehner
2009/0019484 A1 1/2009 Jo et al.
2009/0106366 A1 4/2009 Virtanen et al.
2009/0132395 A1 5/2009 Lam
2009/0171760 A1 7/2009 Aarnio
2009/0175214 A1 7/2009 Sfar et al.
2009/0190544 A1 7/2009 Meylan et al.
2009/0222873 A1 9/2009 Einarsson
2009/0228339 A1 9/2009 Wolf et al.
2009/0234749 A1 9/2009 Fjellanger et al.
2009/0276284 A1 11/2009 Yost
2009/0319436 A1 12/2009 Andra et al.
2010/0049654 A1* 2/2010 Pilo ....................... G06Q 20/02 705/43
2010/0076775 A1 3/2010 Tesler et al.
2010/0115419 A1 5/2010 Mizuno
2010/0235256 A1 9/2010 Kang
2010/0279618 A1 11/2010 Morton et al.
2010/0312724 A1 12/2010 Pinckney
2011/0022465 A1 1/2011 Malleshaiah et al.
2011/0106674 A1* 5/2011 Perlman ................ G06Q 20/40 705/30
2011/0131106 A1 6/2011 Eberstadt et al.
2011/0173056 A1 7/2011 D'Alessio et al.
2011/0173095 A1* 7/2011 Kassaei ................. G06Q 30/02 705/26.41
2011/0225048 A1 9/2011 Nair
2011/0252121 A1 10/2011 Borgs
2011/0255448 A1 10/2011 Hartman et al.
2011/0276377 A1 11/2011 Kim
2011/0276631 A1 11/2011 Schmitt
2011/0282941 A1 11/2011 Chan et al.
2011/0320373 A1* 12/2011 Lee ....................... G06Q 50/01 705/319
2012/0005209 A1 1/2012 Rinearson et al.
2012/0016678 A1 1/2012 Gruber et al.
2012/0030210 A1* 2/2012 Sankhla ........... G06F 17/30699 707/741
2012/0065884 A1 3/2012 Sung et al.
2012/0095841 A1 4/2012 Luckerman et al.
2012/0095862 A1 4/2012 Schiff
2012/0109781 A1 5/2012 Felt
2012/0109792 A1 5/2012 Eftekhari
2012/0117584 A1 5/2012 Gordon
2012/0136756 A1 5/2012 Jitkoff et al.
2012/0163309 A1 6/2012 Ma et al.

(56) References Cited

U.S. PATENT DOCUMENTS

| | | | | |
|---|---|---|---|---|
| 2012/0166333 | A1* | 6/2012 | von Behren | G06Q 20/10 705/41 |
| 2012/0170534 | A1 | 7/2012 | Kim et al. | |
| 2012/0197722 | A1 | 8/2012 | Mesaros | |
| 2012/0197979 | A1 | 8/2012 | Palm | |
| 2012/0203832 | A1 | 8/2012 | Vastardis et al. | |
| 2012/0209839 | A1 | 8/2012 | Andrews et al. | |
| 2012/0253790 | A1 | 10/2012 | Heck et al. | |
| 2012/0254096 | A1 | 10/2012 | Flinn et al. | |
| 2012/0278127 | A1 | 11/2012 | Kirakosyan | |
| 2012/0278625 | A1 | 11/2012 | Narayanan et al. | |
| 2012/0284144 | A1 | 11/2012 | Herbst et al. | |
| 2012/0290399 | A1 | 11/2012 | England | |
| 2012/0296978 | A1 | 11/2012 | Inoue | |
| 2012/0303425 | A1 | 11/2012 | Katzin et al. | |
| 2012/0330980 | A1 | 12/2012 | Rubin et al. | |
| 2013/0013807 | A1 | 1/2013 | Charapko et al. | |
| 2013/0054407 | A1 | 2/2013 | Sabur | |
| 2013/0060625 | A1 | 3/2013 | Davis et al. | |
| 2013/0060850 | A1 | 3/2013 | Davis | |
| 2013/0073989 | A1 | 3/2013 | Harris | |
| 2013/0091013 | A1 | 4/2013 | Wang | |
| 2013/0094537 | A1 | 4/2013 | Hui et al. | |
| 2013/0097056 | A1 | 4/2013 | Sun et al. | |
| 2013/0097142 | A1 | 4/2013 | Kim et al. | |
| 2013/0124357 | A1 | 5/2013 | He et al. | |
| 2013/0173334 | A1 | 7/2013 | Etchegoyen | |
| 2013/0178239 | A1 | 7/2013 | Roberts et al. | |
| 2013/0179440 | A1* | 7/2013 | Gordon | G06Q 30/02 707/731 |
| 2013/0191316 | A1 | 7/2013 | Etchegoyen | |
| 2013/0219468 | A1 | 8/2013 | Bell | |
| 2013/0291007 | A1 | 10/2013 | Shimy et al. | |
| 2013/0332307 | A1 | 12/2013 | Linden | |
| 2014/0258243 | A1 | 9/2014 | Bell | |

FOREIGN PATENT DOCUMENTS

| | | | |
|---|---|---|---|
| JP | 2009123192 | 6/2009 | |
| JP | 2011170471 | 9/2011 | |
| KR | 20010076971 | 8/2001 | |
| KR | 20020090816 | 12/2002 | |
| KR | 100825204 | 4/2008 | |
| KR | 20110117475 | 10/2011 | |
| WO | 2010017596 | 2/2010 | |
| WO | WO 2010017596 A1 * | 2/2010 | G06Q 30/00 |
| WO | 2010099632 | 9/2010 | |

OTHER PUBLICATIONS

International Search Report and Written Opinion, PCT/US2013/041700, dated Sep. 17, 2013, 14 pgs.
International Search Report and Written Opinion, PCT/US2013/041702, dated Aug. 27, 2013, 12 pgs.
International Search Report and Written Opinion, PCT/US2013/041705, dated Aug. 27, 2013, 12 pgs.
International Search Report and Written Opinion, PCT/US2013/041707, dated Aug. 27, 2013, 10 pgs.
International Search Report and Written Opinion, PCT/US2013/041714, dated Aug. 27, 2013, 11 pgs.
Blake, P. (1997), Exploring the news, Information World Review, (121), 17-18, Retrieved from http://search.proquest.com/docview/199371966?accountid=14753.
"Propagation of Trust and Distrust." Guha, R.; Kumar, Ravi; Raghavan, Prabhakar; Tomkins, Andrew. WWW '04 Procedding of the Mar. 13, 2004.
Adweek. (Apr. 23, 2009). Retailers Utilize Facebook Connect to Make Online Shipping More Social, Personal. Retrieved Apr. 14, 2017, from http://www.adweek.com/digital/retailers-utilize-facebook-connect-to-make-shopping-more-social-personal/ Apr. 23, 2009.
Entrepreneurr. (Mar. 17, 2012). A Plattorm for Stylepreneurs: Pintrest Meets Online Department Store. Retrieved Apr. 14, 2017, from http://web-beta.archive.org/web/2012031919141/https://www.entrepreneur.com/article/222812 Mar. 17, 2012.
Merriam-Webster, "cease", 2015 Aug. 4, 2015.
Merriam-Webster, "majority", 2015 Aug. 4, 2015.
Merriam-Webster, "primary", 2015 Aug. 4, 2015.
Merriam-Webster, "log on", 2016 May 20, 2016.
Merriam-Webster, "log out", 2016 May 20, 2016.
Merriam-Webster, "schedule", 2016 Jan. 1, 2016.
Talisma email and answer product combo addresses volume email challengers. (Jul. 31, 2008). Business Wire, retrieved from https://dialog.proquest.com/professional/docview/677381891?accountid=142257 Jul. 31, 2008.

* cited by examiner

Network Adapter
220
Memory ROM/RAM
208
Hard Drive
114
CD-Rom Drive
116
Universal Serial Bus
112
Disk Controller
204
Graphics Adapter
224
214
System Bus
Video Controller
202
Monitor
106
CPU
210
Keyboard Adapter
226
Keyboard
104
Mouse Adapter
206
Mouse
110
Other I/O Devices
222

INITIATION OF PURCHASE TRANSACTION IN RESPONSE TO A REPLY TO A RECOMMENDATION

CROSS-REFERENCE TO RELATED APPLICATION

This patent application claims priority to U.S. Provisional Application Ser. No. 61/990,575, filed on May 8, 2014, entitled "Initiation of Purchase Transaction in Response to a Reply to a Recommendation," and is a continuation-in-part of the following: (1) U.S. application Ser. No. 13/986,606, filed May 16, 2013, entitled "Progressively Asking for Increasing Amounts of User and Network Data;" (2) U.S. application Ser. No. 13/986,607, filed May 16, 2013, entitled "Conversational Interfaces;" (3) U.S. application Ser. No. 13/986,608, filed May 16, 2013, entitled "Universal Communications Infrastructure;" (4) U.S. application Ser. No. 13/896,310, filed May 16, 2013, entitled "Zero Click Commerce Systems;" (5) U.S. application Ser. No. 13/986,612, filed May 16, 2013, entitled "Universal Consumption Service;" (6) U.S. application Ser. No. 13/896,318, filed May 16, 2013, entitled "Reward Structures;" and (7) U.S. application Ser. No. 13/896,292, filed May 16, 2013, entitled "Pre-Establishing Purchasing Intent for Computer Based Commerce Systems" entitled "System and Method for Social Network Based Referrals;" and all of which claim priority to the following: U.S. Provisional Application Ser. No. 61/888,655, filed on May 18, 2012, entitled "System and Method for Social Network Based Referrals," U.S. Provisional Application Ser. No. 61/648,566, filed on May 17, 2012, entitled "Conversational Interfaces," U.S. Provisional Application Ser. No. 61/648,569, filed on May 17, 2012, entitled "Universal Communications Infrastructure," U.S. Provisional Application Ser. No. 61/648,582, filed on May 17, 2012, entitled "Universal Consumption Service," U.S. Provisional Application Ser. No. 61/648,588, filed on May 17, 2012, entitled "Reward Structures," U.S. Provisional Application Ser. No. 61/648,591, filed on May 17, 2012, entitled "System and Method for Social Network Based Referrals," U.S. Provisional Application Ser. No. 61/648,564, filed on May 17, 2012, entitled "Progressively Asking for Increasing Amounts of User and Network Data," and U.S. Provisional Application Ser. No. 61/648,578, filed on May 17, 2012, entitled "Trust Graph."

This patent application is also a continuation-in-part of U.S. application Ser. No. 13/769,181, filed Feb. 15, 2013, entitled "Trust Graphs," which claims priority to U.S. Provisional Application Ser. No. 61/888,655, filed on May 18, 2012, entitled "System and Method for Social Network Based Referrals," U.S. Provisional Application Ser. No. 61/648,578, filed on May 17, 2012, entitled "Trust Graph," and U.S. Provisional Application Ser. No. 61/648,591, filed on May 17, 2012, entitled "System and Method for Social Network Based Referrals."

The disclosures of all of the above applications are incorporated herein by reference.

TECHNICAL FIELD

The disclosed embodiments relate to the field of online commerce generally and in particular to providing convenient commerce interaction for users.

BACKGROUND

Over the last two decades, the number of online services has increased dramatically. Online services that have emerged comprise, for example, online commerce services and social networking services. These services open up new experiences for users, including interactions between users and new ways of shopping for products and services. These services incur a positive network effect as more users sign up and use the service.

Social networks can be a great source of recommendations for products and services to purchasers. A user typically trusts members of his social network more than strangers, and thus recommendations for products and services coming from the user's social network are more likely to lead to purchase transactions than recommendations from strangers (e.g., a random online review). However, the process of initiating a purchase transaction from a recommendation within a social network is inefficient.

BRIEF DESCRIPTION OF THE DRAWINGS

To facilitate further description of the embodiments, the following drawings are provided in which.

To facilitate further description of the embodiments, the following drawings are provided in which.

Figure 1:
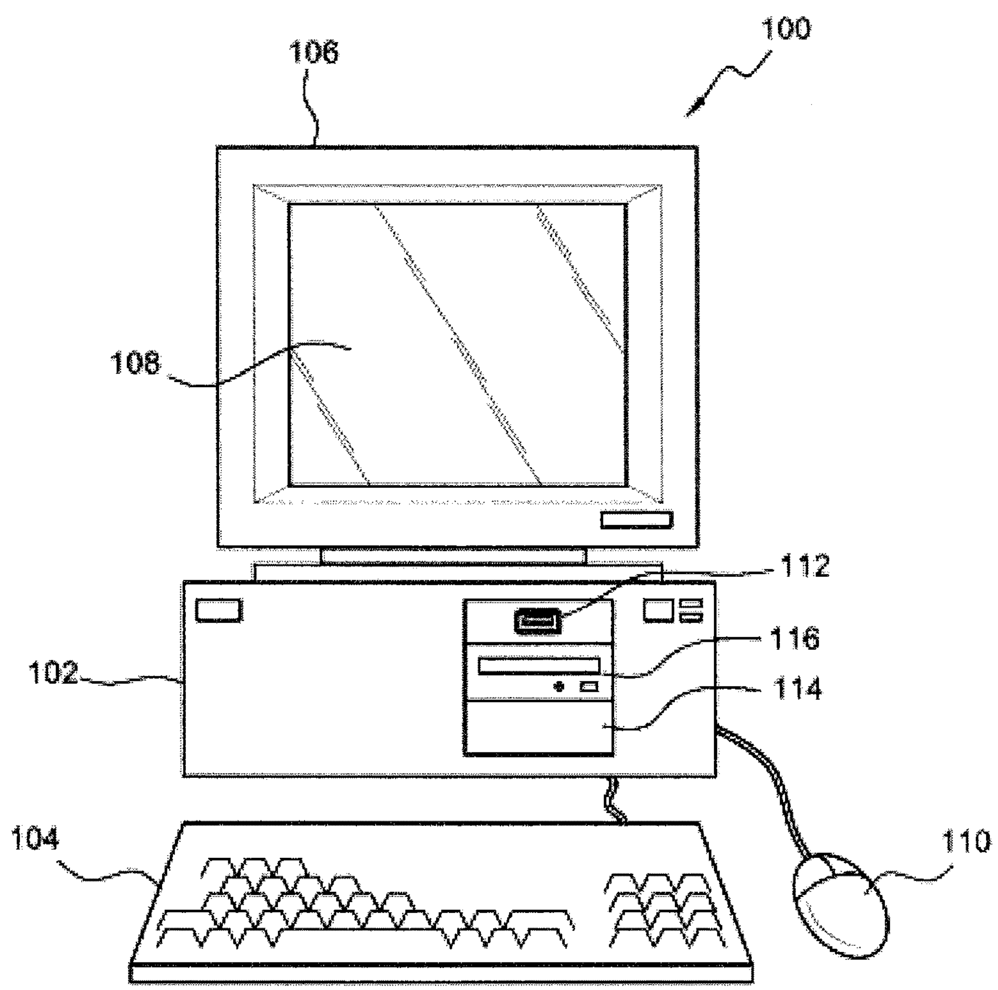
FIG. 1 illustrates a front elevation view of a computer system that is suitable for implementing at least part of a central computer system.

For simplicity and clarity of illustration, the drawing FIGs. illustrate the general manner of construction, and descriptions and details of well-known features and techniques may be omitted to avoid unnecessarily obscuring the present disclosure. Additionally, elements in the drawing FIGs. are not necessarily drawn to scale. For example, the dimensions of some of the elements in the FIGs. may be exaggerated relative to other elements to help improve understanding of embodiments of the present disclosure. The same reference numerals in different FIGs. denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "comprise," and "have," and any variations thereof, are intended to cover a non-exclusive inclusion, such that a process, method, system, article, device, or apparatus that comprises a list of elements is not necessarily limited to those elements, but may comprise other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and comprise electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In various embodiments, initiation of purchase transaction in response to a reply to a recommendation comprises a method. The method comprises, at a computer system having one or more processors and non-transitory memory storing one or more programs for execution by the one or more processors, detecting a recommendation associated with a first user, the recommendation associated with a product or service. The method further comprises detecting a response from a second user to the recommendation, determining whether the response from the second user comprises a purchase decision, and in accordance with a determination that the response from the second user comprises the purchase decision, initiating a transaction for the second user to purchase the product or service associated with the recommendation.

In one embodiment, a system comprises an input device, a video display, one or more processing modules, and one or more non-transitory memory storage modules storing computer instructions configured to run on the one or more processing modules. The one or more non-transitory memory storage modules storing computer instructions are configured to perform acts of detecting a recommendation associated with a first user, the recommendation associated with a product or service, detecting a response from a second user to the recommendation and determining whether the response from the second user comprises a purchase decision. In accordance with a determination that the response from the second user comprises the purchase decision, the one or more non-transitory memory storage modules storing computer instructions also are configured to perform the act of initiating a transaction for the second user to purchase the product or service associated with the recommendation.

In one embodiment, a non-transitory computer readable storage medium storing one or more programs is configured for execution by an electronic device. The one or more programs comprise instructions for detecting a recommendation associated with a first user, the recommendation associated with a product or service, detecting a response from a second user to the recommendation, and determining whether the response from the second user comprises a purchase decision. The one or more programs also comprise instructions for, in accordance with a determination that the response from the second user comprises the purchase decision, initiating a transaction for the second user to purchase the product or service associated with the recommendation.

Figure 2:
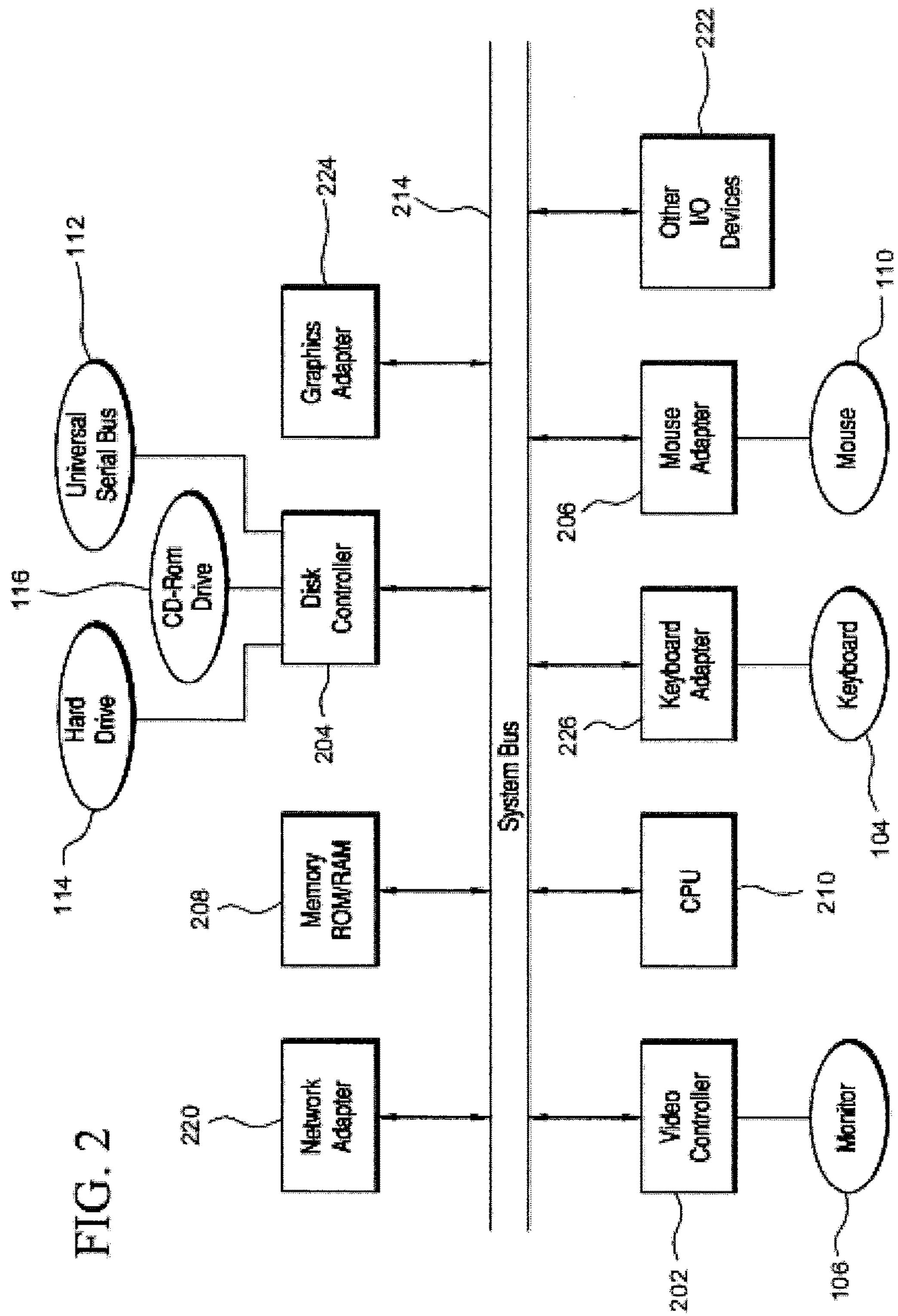
FIG. 2 illustrates a representative block diagram of exemplary elements comprised on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements comprised on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can comprise dynamic RAM (DRAM), static RAM (SRAM), etc. Further, ROM can comprise mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
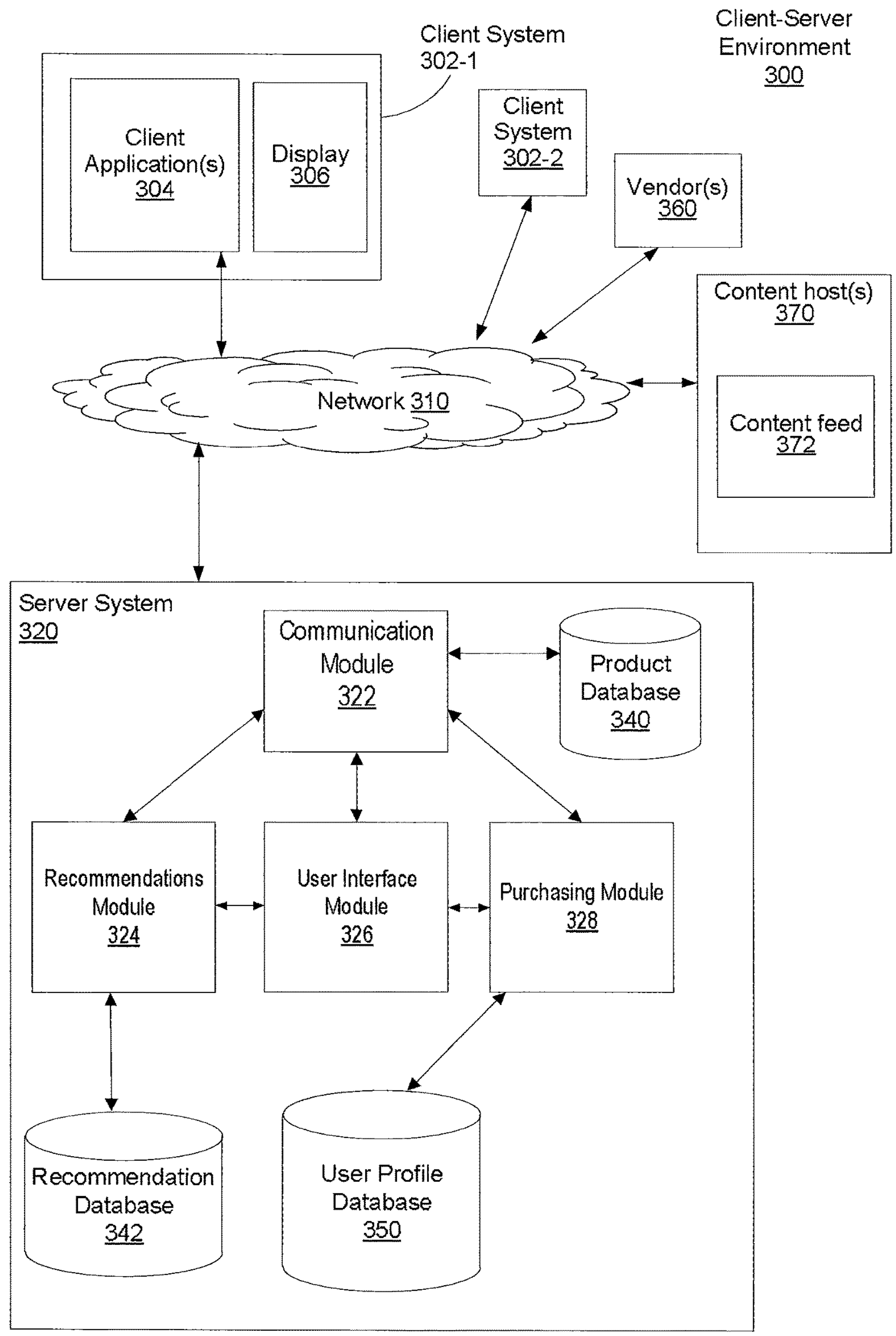
FIG. 3 is a block diagram illustrating a client-server environment in accordance with some embodiments.

Skipping ahead now in the drawings, FIG. 3 illustrates a block diagram illustrating a client-server environment 300, according to an embodiment. Client-server environment 300 is merely exemplary and embodiments of the system are not limited to the embodiments presented herein. Client-server environment 300 can be employed in many different embodiments or examples not specifically depicted or described herein. In some embodiments, certain elements or modules of client-server environment 300 can perform various methods and/or activities of those methods. In these or other embodiments, the methods and/or the activities of the methods can be performed by other suitable elements or modules of client-server environment 300.

In many embodiments, client-server environment 300 can comprise one or more client systems 302 (e.g., 302-1 and 302-2), a server system 320, one or more content hosts 370, and one or more vendors 360, all connected over a network 310. In some embodiments, vendors 360 are commercial organizations with products to sell. In some embodiments, vendors 360 are other users which have listed products or services for sale, for example on a listing website such as CRAIGSLIST, or an auction website such as EBAY. Vendors 160 receive orders to purchase products from server system 320 and fulfill those orders.

In some embodiments, client system 302 can comprise one or more client applications 304 and a display 306. Server system 320 comprises a communication module 322, a recommendations module 324, a user interface module 326, a purchasing module 328, a product database 340, a recommendation database 342, and a user profile database 350. Network 310 can be any of a variety of networks, including local area networks (LAN), wide area networks (WAN), wireless networks, wired networks, the Internet, or a combination of such networks.

In accordance with some embodiments, client system 302 can comprise one or more client applications 304. One or more client applications 304 can comprise, but are not limited to, a web browsing application or a dedicated application for connecting to server system 320. Client system 302 also can comprise a display 306. In some embodiments, display 306 can be integrated directly into a client device, such as laptops, smart phones, and tablet computers. In some embodiments, the client device can be connected to, but not integrated into client system 302. For example, personal computer systems typically do not have an integrated display and instead connect to a standalone display either wirelessly or otherwise.

In some embodiments, content host 370 hosts content (e.g., content items, web pages) and a service within which the content is generated. For example, the service is one in which users and applications can generate and/or post content items (e.g., posts, status updates, shared photos and videos, shared links). In some embodiments, the service hosted by content host 370 can be a social networking service, a blogging or microblogging service, a message board or forums, or an image (e.g., photos, video) sharing service. In some embodiments, the content is presented as a content feed 372 or collection of content items organized chronologically (e.g., a timeline), categorically, or by any other suitable criterion or criteria. Content host 370 also can enable users who view a content item on content host 370 to respond to the content item (e.g., reply to a tweet, reply within a message thread, comment on a post or status update).

In some embodiments client system 302 can receive one or more recommendations, made by a first user, for respective goods, products, or services, from server system 320 or from content host 370. Client system 320 can display, configure for display, or send instructions to display, the one or more recommendations to a second user. In some embodiments, when the second user responds to (e.g., posts a reply to or comments on) the recommendation, server system 320 can receive the response and determine if the response comprises a purchase decision by the second user.

In some embodiments, communication module 322 can be configured to send and receive communication over network 310 to one or more client systems 302, one or more vendors 360, and/or one or more content hosts 370. In some embodiments, recommendations module 324 can be configured to send recommendations made at server system 320 to content host 370 for posting at content host 370 or to client system 302 for display, and to detect recommendations posted by users to content hosts 370. In some embodiments, recommendations module 324 can communicate recommendations to client system 302 in a web page generated by user interface module 326 or in other modalities (e.g., sent in an email message, posted at content host 370, etc.).

In some embodiments, recommendations module 324 can be configured to send recommendations made by the first user to content host 370 through an interface with content host 370 (e.g., an application programming interface (API)). Content host 370 can associate the recommendation with the first user (e.g., inserting the recommendation into content feed 372 under the first user's account at content host 370). Other users can view the posted recommendation and respond to the recommendation. Content host 370 can send responses to the posted recommendation to server system 320, also through the interface.

In some embodiments, recommendations module 324 can be configured to detect recommendations posted on content host 370 by users. For example, recommendations module 324 can access content items posted by a user on content host 370 (e.g., accesses publicly accessible content items on content host 370 and/or accesses content feed 372 of the user's content items through an API interface with content host 370 and with the user's authorization), and determines if any of the accessed content items are recommendations. For content items that are determined to be recommendations, server system 320 also can access any responses to these recommendations. Purchasing module 328 can be configured to determine if any of the accessed responses comprise purchase decisions.

In some embodiments, user interface module 326 can be configured to arrange a web page or other display presentation associated with server system 320 such that, when requested by client system 302 associated with a user, the web page/display presentation can comprise recommendations customized to a requesting user. User interface module 326 can determine categories of interest to the user based at least in part on the user's profile, previous purchases, search history, viewing history, prior product reviews, and/or prior product recommendations, and/or items on user profiles of users they trust, among other factors. User interface module 326 can determine recommendations for a respective category in the determined categories by identifying users trusted by the requesting user in the respective categories who have recommendations in those categories. In some embodiments, the determined recommendations are combined with traditional search results. Any method of searching products in response to a search query can be used to produce traditional search results.

In some embodiments, user interface module 326 can rank the recommendations by a trust level the requesting user has with the recommending user (either direct or indirect trust), the overall popularity of the product recommended, the amount of time passed since the time the recommendation was made, professional reviews, prior purchasing decisions, prior product reviews, prior recommendations, and/or other factors comprised in the requesting user's profile, such as price, size, color, materials, features, and/or brand. In some embodiments, user interface module 326 can configure the web page/display presentation to display categories in order of determined interest to the requesting user, with higher categories being of more interest than lower categories.

In some embodiments user interface module 326 can order recommendations within a particular category on the web page/display presentation by a predicted interest of the user such that the higher a product is ranked in accordance with the predicted interest of the user, the sooner the recommendation is displayed. In some embodiments, products can receive a ranking score based at least in part on predicted interest of the user and ordered based at least in part on the ranking score. In some embodiments user interface module 326 can configure the display, or the instructions for display on the web page, to display the recommendations as an image of the recommended product. In some embodiments user interface module 326 can comprise an image of the recommending user on top of or near the image of the recommended product.

In some embodiments, at client system 302, a responding user who accesses a recommendation (e.g., through a web page/display presentation or other modality from server system 320 or content host 370) can respond to the recommendation. The response to the recommendation (e.g., a reply, a comment, a like, an upvote, a share) can comprise text and/or images and/or emoticons. The response to the recommendation can be received or otherwise detected by server system 320.

In some embodiments, purchasing module 328 can be configured to receive or otherwise detect the response by the responding user to the recommendation and determine if the response comprises a decision by the responding user to purchase the good or service recommended by the recommendation (hereinafter "purchase decision"). In some embodiments, purchasing module 328 can determine whether the response comprises the purchase decision based at least in part on the text or other content ((e.g., a reply, an emoticon, an image, a like, an upvote, a share), in the response. For example, if the response comprises one or more pre-specified keywords or "magic words," and/or excludes one or more pre-specified other keywords, then purchasing module 328 determines that the recommendation comprises the purchase decision by the responding user. In some embodiments, purchasing module 328 uses natural language processing to determine if the response comprises a purchase decision by the responding user. In some embodiments, the responding user can configure a set of keywords which indicate the purchasing decision. In a non-limiting example, the keywords for the purchasing decision can comprise words such as: "buy," "I want," "ship it," "purchase," and/or "send me one." In the same or other embodiments, if the response excludes words such as "don't buy" or "don't," purchasing module 328 can determine that the response indicates the purchase decision.

If the response is determined to comprise a purchase decision, purchasing module 328 can be configured to initiate a purchase transaction by the responding user for the good or service recommended in the recommendation. Based at least in part on the recommendation, purchasing module 328 can determine the good or service to be purchased and identifies the relevant vendor in products database 340. Purchasing module 328 can enlist communication module 322 to purchase the desired product from one of the vendors 360 available over network 310. If the response is determined to not comprise a purchase decision, purchasing module 328 does not initiate the purchase transaction.

In some embodiments, initiation of the purchase transaction can comprise prompting the responding user for confirmation or approval of the purchase transaction and/or requesting information for proceeding with the purchase transaction. For example, purchasing module 328 can use information on the responding user stored in user profile database 350 (e.g., shipping information, payment information) to carry out the purchase transaction. If any necessary information is missing from user profile database 350, purchasing module 328 can send a request to client system 302 of the responding user to prompt the responding user for the information. When the responding user responds to the prompt with the information, client system 302 can send the information to server system 320, where purchasing module 328 can use the information to carry out the purchase transaction, and the information is optionally stored in user profile database 150, or the user profile database 150 is updated, for future use.

In the same or other embodiment, before finalizing the purchase transaction, purchasing module 328 can send a request to client system 302 of the responding user to prompt the user for confirmation or approval of the purchase transaction. When the responding user responds to the prompt with the confirmation or approval, client system 302 can send the confirmation or approval to server system 320, where purchasing module 328 can proceed with the purchase transaction in response to the confirmation or approval.

In some embodiments, product database 340 can contain information for goods and services that can be purchased through server system 320. In some embodiments the goods and services in product database 340 can be added by vendors 360. In some embodiments, the goods and services in product database 340 can be added by users and recommenders in server system 320. Products database 340 can comprise information for each good or service, including, but not limited to, the price of the good or service, its specification (size, color, etc.), and/or the vendor or vendors from vendors 360 from which the good or service is available. In some embodiments, client system 302 can send the response to the recommendation to server system 320, and purchasing module 328 can determine whether the response comprises the purchase decision. If purchasing module 328 determines that the response comprises the purchase decision, purchasing module 328 can initiate the purchase transaction, in which information stored in product database 340 can be used to purchase the product recommended in the recommendation.

In some embodiments, recommendation database 342 stores recommendations received from users of server system 320. In some embodiments, recommendation database 342 maintains a list or record of recommendations made by users of the database, how successful those recommendations were (what percentage of users purchased the recommended product when give this recommendation), and information concerning the request for recommendation that prompted the recommendation. In other embodiments, only a portion of the total recommendations are retained in recommendation database 342 at any given time, based at least in part on: how long ago the recommendation was made, whether the product is still available, the trustworthiness of the recommending user, and/or how popular the recommendation has been, etc. In some embodiments, recommendations database 342 also can store responses to recommendations stored in recommendations database 342, and/or at least the responses that are determined to comprise purchase decisions.

In some embodiments user profile database 350 contains user profiles for users who have registered to use the service provided by server system 320. In some embodiments, a user profile comprises the name, user/account profile ID, demographic information (gender, age, location, etc.), purchasing history, social network information, information for facilitating purchase transactions (e.g., credit card and/or other payment information, billing addresses, shipping addresses, shipping method preferences), and/or trust information. Trust information can comprise information regarding the trust between users, including, for example, scores or other valuations of the trusts between the user (to which the user profile corresponds) and/or other users, and/or a history of actions that affected the valuations of the trusts. Additional details regarding one method of providing or managing trust information can be found in U.S. patent application Ser. No. 13/769,181 filed Feb. 15, 2013, entitled "Trust Graph," which is incorporated by reference herein in its entirety.

In some embodiments, server system 320 provides the recommendation made by the first user to a second user within a trust network of the first user. The recommendation can be provided through any of method (e.g., web page generated by user interface module 326, posted at content host 370 as a content item accessible by the second user, sent to the second user as an email, text message, etc.). In some embodiments, server system 320 randomly selects a recommendation made by a user within the first user's trust network to provide to the first user. In some embodiments, server system 320 selects a recommendation made by a user within the first user's trust network to provide to the first user based at least in part on one or more criteria, such as a trust level from the first user to the user making the recommendation, how recent the recommendation is, etc. When the user responds to the recommendation, server system 320 determines whether the response comprises the purchase decision. If server system 320 determines that the response comprises the purchase decision, server system 320 initiates a transaction for the second user to purchase the recommended good or service, and increases a trust level from the second user to the first user; by accepting the first user's recommendation, the second user indicates trust in the first user.

Figure 4:
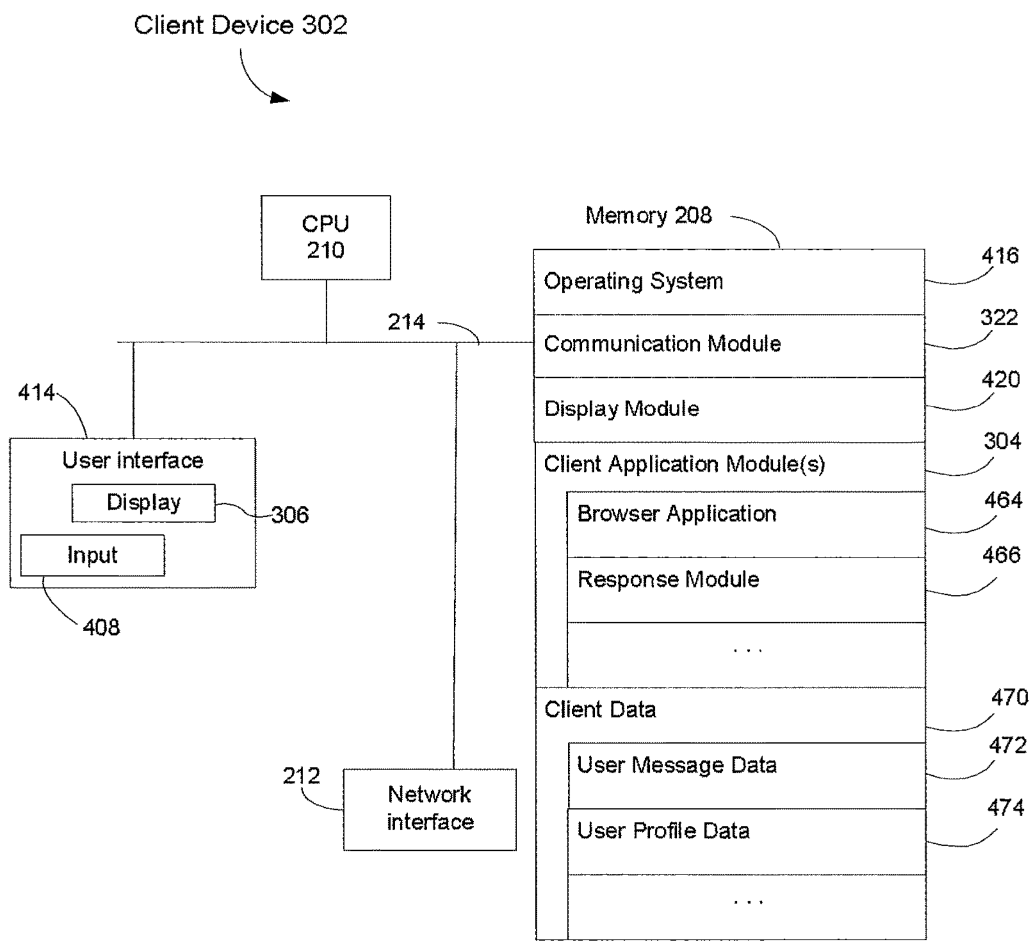
FIG. 4 is a block diagram illustrating a client system in accordance with some embodiments.

FIG. 4 is a block diagram illustrating client system 302, in accordance with some embodiments. In some embodiments, client system 302 comprises one or more processing units (CPUs) 210, one or more network interfaces 212, memory 208, and one or more communication buses 214 for interconnecting these components. In many embodiments, client system 302 comprises a user interface 414. User interface 414 comprises an associated display device 306 and/or one or more input devices 408 such as a keyboard, mouse, a touch-sensitive display, a touch-sensitive surface, or other input buttons. In some embodiments, client system 302 comprises an audio device or other information delivery device. Furthermore, some client systems 302 comprise a microphone and/or voice recognition to supplement or replace the keyboard.

In some embodiments, memory 208 comprises high-speed random access memory, such as DRAM, SRAM, DDR RAM or other random access solid state memory devices; and may comprise non-volatile memory, such as one or more magnetic disk storage devices, optical disk storage devices, flash memory devices, or other non-volatile solid state storage devices. Memory 208 can comprise one or more storage devices remotely located from the CPU(s) 210. Memory 208, or alternately the non-volatile memory device(s) within memory 208, can comprise a non-transitory computer readable storage medium. In some embodiments, memory 208 or the computer readable storage medium of memory 208 stores the following programs, modules, and data structures, or a subset thereof:

- an operating system 416 that comprises procedures for handling various basic system services and for performing hardware dependent tasks;
- a communication module 322 that can be used for connecting the client system 302 to other computers via the one or more communication network interfaces 212 (wired or wireless) and one or more communication networks, such as the Internet, other wide area networks, local area networks, metropolitan area networks, etc.;
- a display module 420 for enabling display of content and media on a display 306 associated with the client system 302;
- one or more client applications module(s) 304 for enabling the client system 302 to perform the functions offered by the client system 302, including but not limited to:
  - a browser application 464 for sending requests to a server system (e.g., server system 320, FIG. 3) or a content host (e.g., content host 370, FIG. 3) and displaying the information (e.g., web pages, recommendations) returned by the server system (e.g., server system 320, FIG. 3) or the content host (e.g., content host 370, FIG. 3); or a smartphone app that performs the same function;
  - a response module 466 for enabling a user to respond to information (e.g., responding to a recommendation) returned by the server system (e.g., server system 320, FIG. 3) or the content host (e.g., content host 370, FIG. 3) and displayed in the browser application 464; and
- client data 470 for storing data related to the client system 302, including but not limited to:
  - client message data 472, including data representing messages or communications to be sent to the server system (e.g., server system 320, FIG. 3) or the content host (e.g., content host 370, FIG. 3) and messages received from the server system (e.g., server system 320, FIG. 3) or the content host (e.g., content host 370, FIG. 3); and
  - user profile data 474, including information concerning users of the client system 302 such as a user profile, user preferences and interests, and other information relevant to providing services to the user.

Figure 5:
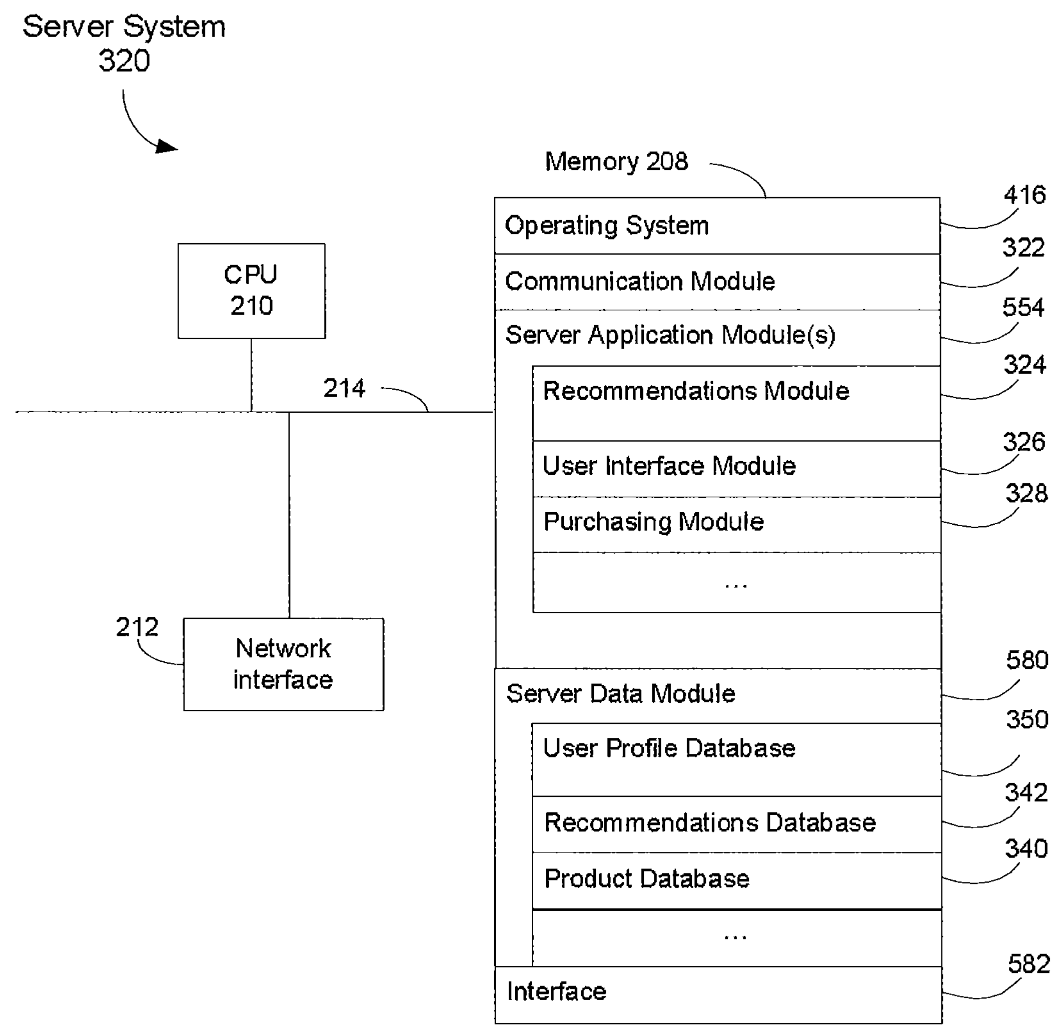
FIG. 5 is a block diagram illustrating a server system in accordance with some embodiments.

FIG. 5 is a block diagram illustrating server system 320, in accordance with some embodiments. In some embodiments, server system 320 comprises one or more processing units (CPUs) 210, one or more network interfaces 212, memory 208, and one or more communication buses 214 for interconnecting these components.

In some embodiments, memory 208 comprises one or more storage devices remotely located from the CPU(s) 210. Memory 208, or alternately the non-volatile memory device(s) within memory 208, comprises a non-transitory computer readable storage medium. In some embodiments, memory 208 or the computer readable storage medium of memory 208 stores the following programs, modules, and data structures, or a subset thereof:

- operating system 416 that comprises procedures for handling various basic system services and for performing hardware dependent tasks;
- communication module 322 that can be used for connecting server system 320 to other computers via the one or more communication network interfaces 212 (wired or wireless) and one or more communication networks, such as the Internet, other wide area networks, local area networks, metropolitan area networks, etc.;

one or more server application module(s) 554 for enabling server system 320 to perform the functions offered by server system 320, including but not limited to:

recommendations module 324 for sending recommendations to a client system (e.g., client system 302, FIG. 3) or a content host (e.g., content host 370, FIG. 3), and/or detecting recommendations posted to content hosts by users;

user interface module 326 for configuring information sent to the client system for display at the client system; and purchasing module 328 for receiving responses to recommendations from client systems or content hosts, determining if responses comprises purchase decisions, initiating purchase transactions in accordance with purchase decisions that are determined to be comprised in responses, and for purchasing goods or services from one of the vendors (vendors 360, FIG. 3); and one or more server data module(s) 580 for storing data related to server system 320, including but not limited to:

user profile information database 350 including user preferences and interests, user history, including past user purchases, searches, page views, prior product recommendations, prior product reviews, social connections of the user, payment information, shipping information and preferences, etc.;

recommendations database 342 including information about recommendations made by users of server system 320; and product database 340 including information for products that may be purchased through server system 320, including, but not limited to, the price of the product, its features (size, color, etc.), the vendor or vendors from which it is available, and shipping/delivery information of the product; and/or an interface 582 (e.g., an application programming interface) providing a communication interface with a content host (e.g., content host 370, FIG. 3).

In some embodiments, server system 320 also comprises modules and data (not shown) for managing trust networks between users, such as those modules and data described in U.S. patent application Ser. No. 13/769,181 filed Feb. 15, 2013, entitled "Trust Graph," which is incorporated by reference above.

Figure 6:
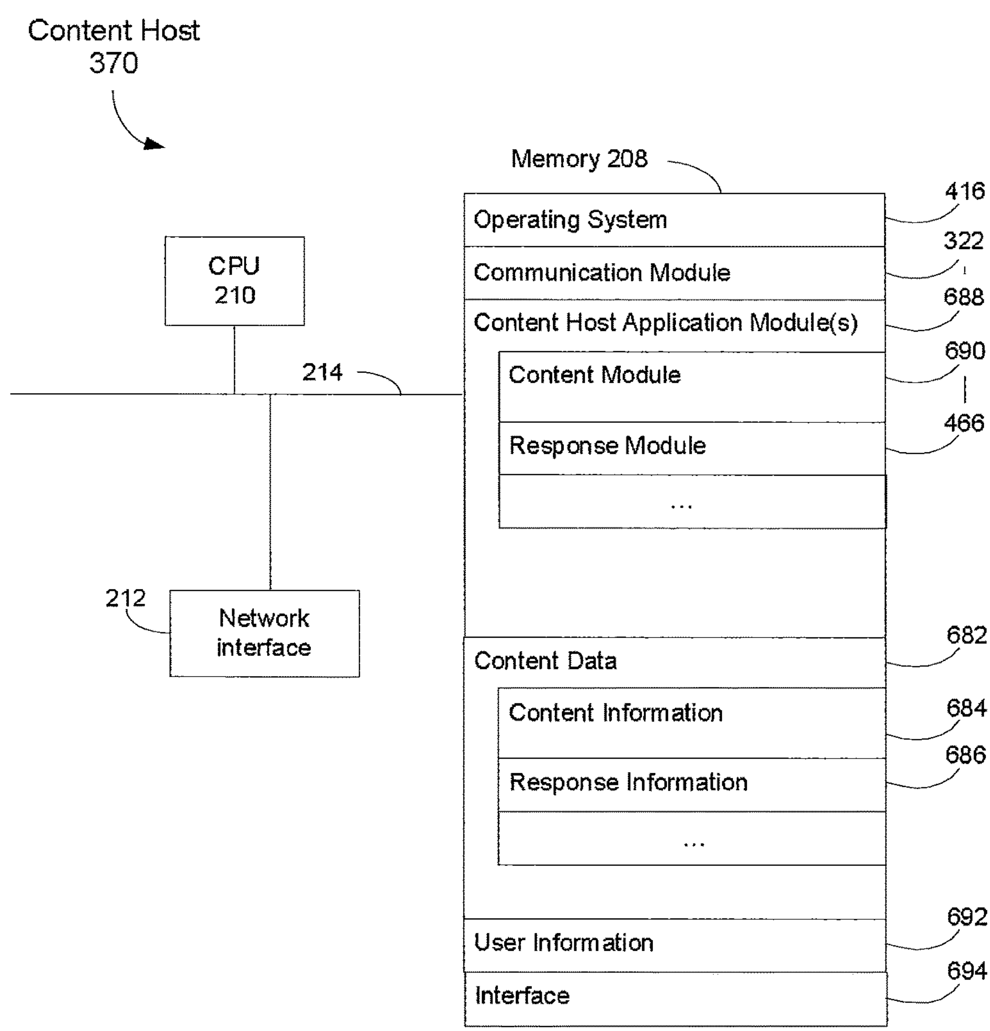
FIG. 6 is a block diagram illustrating a content host in accordance with some embodiments.

FIG. 6 is a block diagram illustrating content host 370, in accordance with some embodiments. In some embodiments, content host 370 comprises one or more processing units (CPUs) 210, one or more network interfaces 212, memory 208, and one or more communication buses 214 for interconnecting these components.

In some embodiments, memory 208 comprises one or more storage devices remotely located from the CPU(s) 402. Memory 406, or alternately the non-volatile memory device(s) within memory 406, comprises a non-transitory computer readable storage medium. In some embodiments, memory 406 or the computer readable storage medium of memory 406 stores the following programs, modules and data structures, or a subset thereof:

operating system 416 that comprises procedures for handling various basic system services and for performing hardware dependent tasks;

communication module 322 that is used for connecting content host 370 to other computers via the one or more communication network interfaces 212 (wired or wireless) and one or more communication networks, such as the Internet, other wide area networks, local area networks, metropolitan area networks, etc.;

one or more content host application module(s) 688 for enabling content host 370 (FIG. 3) to perform the functions offered by content host 370 (FIG. 3), including but not limited to:

a content module 690 for receiving content items from a client system (e.g., client system 302, FIG. 3) or a server system (e.g., server system 320, FIG. 3), configuring content items for display at a client system (e.g., as content feed 372, FIG. 3), and sending content items to the client system for display; and a response module 466 for receiving user responses to content items and sending user responses to the server system;

one or more content data module(s) 682 for storing data related to the content host 370 (FIG. 3), including but not limited to:

content information 684 including content items received from client systems or server systems (e.g., server system 320, FIG. 3) and associations of respective content items with respective users; and response information 686 including responses to content items and associations of respective responses with respective content items and respective users;

user information 692, including accounts and profiles of users of content host, login information, preferences and permissions related to access by a server system (e.g., server system 320, FIG. 3), and content item and response posting history; and/or interface 694 (e.g., an application programming interface) for providing a communication interface with a server system (e.g., server system 320, FIG. 3).

Figure 7:
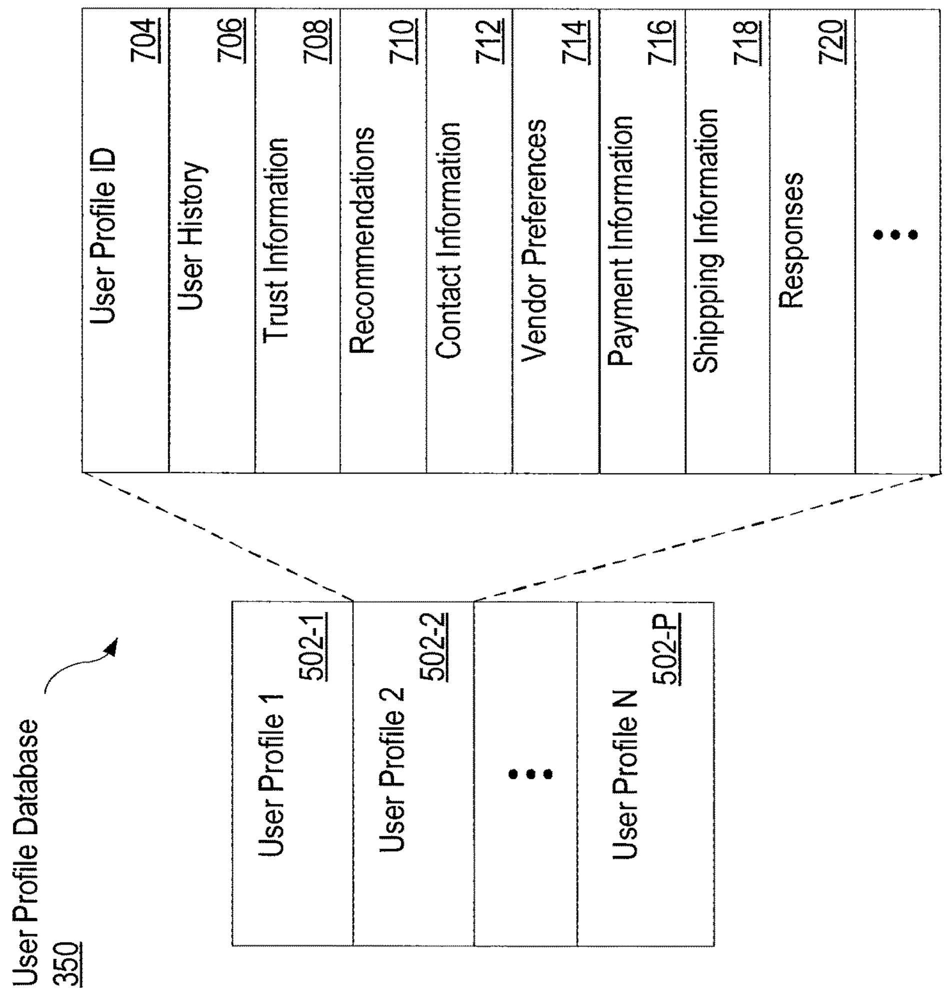
FIG. 7 depicts a block diagram of an exemplary data structure for a user profile database for storing information related to users of the server system, in accordance with some embodiments.

FIG. 7 depicts a block diagram of an exemplary data structure for user profile database 350 for storing information related to users of the server system (e.g., server system 320, FIG. 1). In accordance with some embodiments, user profile database 350 comprises a plurality of user profiles 502-1 to 502-P, each of which corresponds to a user registered with the server system (e.g., server system 320, FIG. 3). In some embodiments, each user profile 502 comprises a user profile ID 704, a user history 706, trust information 708, recommendations 710 made by the user, user contact information 712, vendor preferences 714, payment information 716, shipping information 718, and/or responses 720 to recommendations.

In some embodiments, user/account profile ID 704 comprises a value that uniquely identifies a specific user of the server system (e.g., server system 320, FIG. 3). In some embodiments, this value is chosen by the user and is a user name. In other embodiments, this value is assigned to the user by the server system (e.g., server system 320, FIG. 3) as part of the registration process.

In some embodiments, the user history 706 stores a history of the user's past interactions with the server system (e.g., server system 320, FIG. 3) including past user purchases and purchase details, searches, page views, previous recommendations, previous responses to recommendations, previous product reviews, and social connections of the user including previously recorded trust information for other users and/or social information received from social networking sites.

In some embodiments, trust information 708 comprises data describing the social connections of the user and comprises a trust level for other users of the server system (e.g., server system 320, FIG. 3). A trust level can be a value representing the degree to which a user trusts the opinions and recommendations of another user. In some embodiments, trust information is explicitly submitted by the users, in other situations the server system (e.g., server system 320, FIG. 3) infers trust information from the actions of users, and in yet other situations trust information comprises information from both user submissions and server inferences.

In some embodiments, recommendation 710 data comprises product purchases and product recommendations previously submitted by the user. In some embodiments, contact information 712 comprises a list of contact information for contacting the user through a plurality of communication methods and information describing if and when the server system (e.g., server system 320, FIG. 3) should use that method. For example, the contact information 712 comprises, but is not limited to, email addresses, phone number, Twitter handle, social network ID, website address, physical address and/or any other information that helps the server system (e.g., server system 320, FIG. 3) contact the user. In some embodiments, the user can select that the server system (e.g., server system 320, FIG. 3) should never use social network messaging to contact the user and should use the user's email address at all times except for the weekend and that a text message to a mobile phone should be used on the weekend. In some embodiments, the contact information 712 comprises login and password information for one or more social networking sites or websites.

In some embodiments, the server system (e.g., server system 320, FIG. 3) can use the login and password for a social networking site or website (hosted on a content host 370, FIG. 3) comprised in the contact information 712 to contact the user or post a recommendation made by the user. In some embodiments, the server system (e.g., server system 320, FIG. 3) can use the login and password for the social networking site or website, and with the user's permission, to access content items associated with the user at the social networking site or website (e.g., the content feed of content items posted by the user, the user's social networking feed, the user's blog, message threads in which the user participates or reads, a feed of content items posted by the user's social network). The server system (e.g., server system 320, FIG. 3) can access the content items associated with the user, determine the content items that are recommendations and content items that are recommendation responses by the user, and determine if the responses by the user comprise purchase decisions.

In some embodiments, vendor preference data 714 comprises data indicating the user's vendor preferences. In some embodiments, vendor preference data 714 comprises vendors that the user has explicitly indicated as preferred vendors and vendors that the user has explicitly indicated as non-preferred vendors. In some embodiments, vendor preference data 714 is determined based at least in part on at least in part on previous user behavior (e.g., vendors that the user has repeatedly selected). In some embodiments, a user's vendor preference is based at least in part on feedback or reviews from the user. Vendors that received positive reviews will be noted as potential favored vendors and vendors that receive negative reviews will be noted as potential disfavored vendor.

In some embodiments, contact information 712 stored for the user comprises one or more ways to contact the user including, but not limited to, email addresses, phone number, social network handle, social network ID, webpage address, physical address and any other information that helps the server system (e.g., server system 320, FIG. 3) contact the user.

In some embodiments, payment information 716 comprises information used for collecting users' payments for purchases, such as users' credit card information or money transferring information.

In some embodiments, shipping information 718 comprises information that designates where and how to ship purchased tangible goods. Shipping information 718 comprises, for example, users' shipping addresses and/or shipping preferences (e.g., whether to leave at the door if no one is home, whether signature is required, express shipping, etc.).

In some embodiments, responses 720 comprises responses, made by users of the server system 320 (FIG. 3), to recommendations for goods and services. Responses 720 for a user comprise a user's history of responses to recommendations and whether a response comprises a purchase decision.

Figure 8:
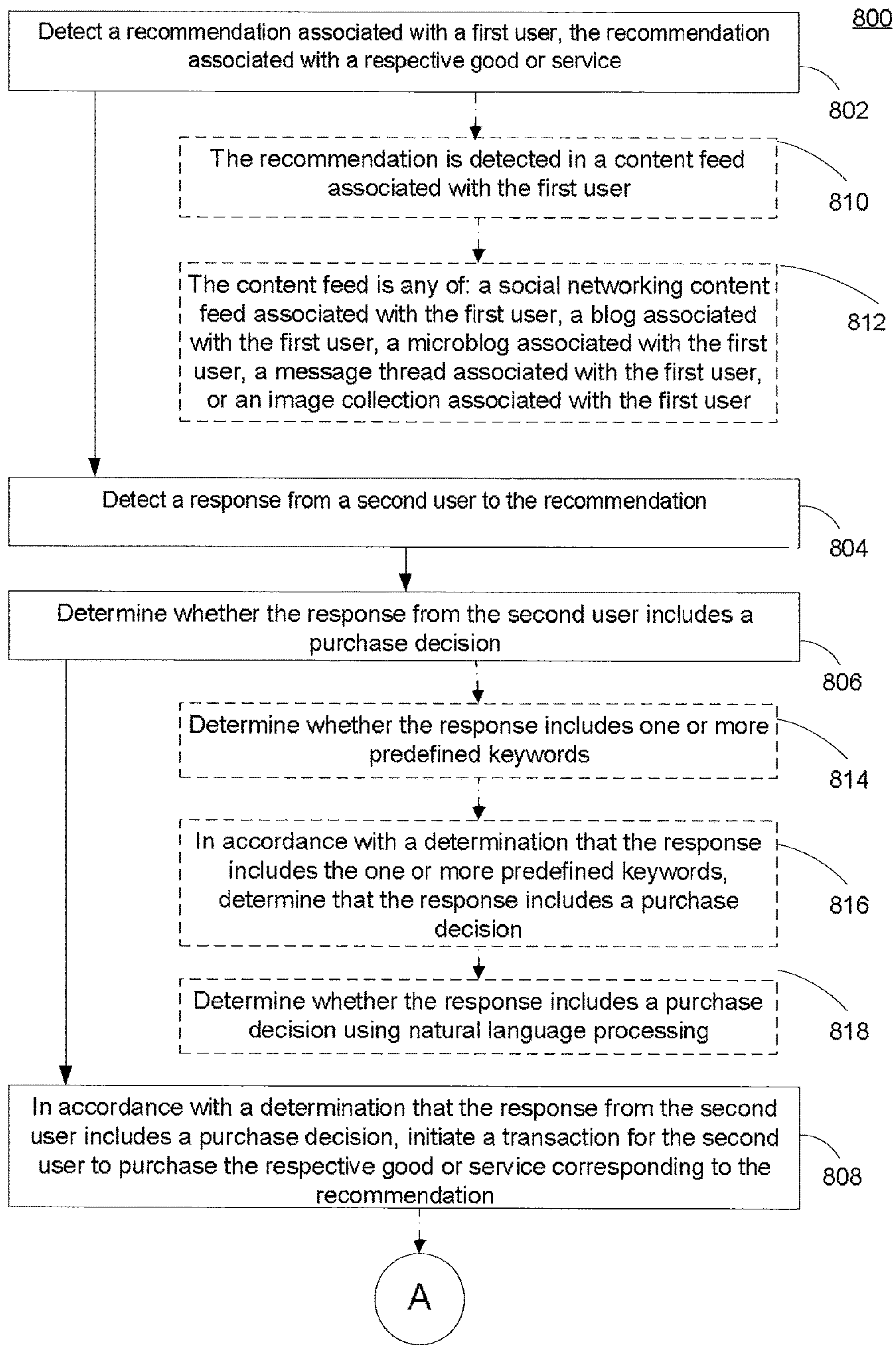
FIG. 8 is a flow diagram illustrating a process for initiating a purchase transaction in response to a reply to a recommendation, in accordance with some embodiments.
Figure 9:
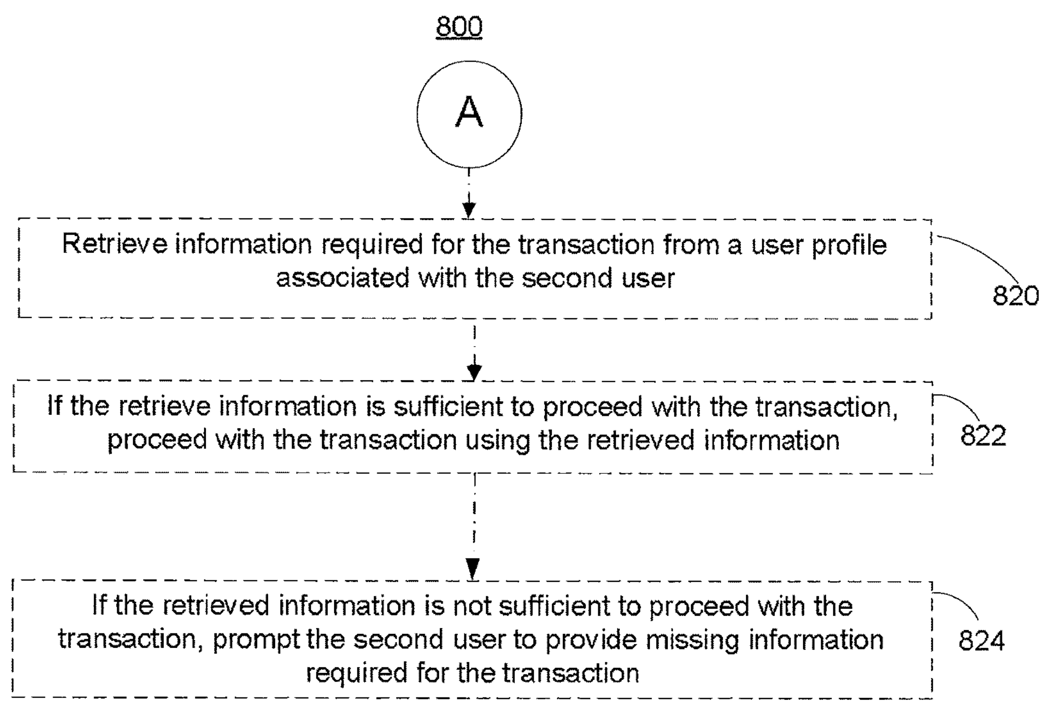
FIG. 9 is a flow diagram illustrating a process for initiating a purchase transaction in response to a reply to a recommendation, in accordance with some embodiments.

FIGS. 8-9 illustrate a flow diagram depicting a method 800 for initiating a purchase transaction in response to a reply to a recommendation, in accordance with some embodiments. Each of the operations shown in FIGS. 8-9 can correspond to instructions stored in a computer memory or computer readable storage medium. Optional operations are indicated by dashed lines (e.g., boxes with dashed-line borders). In some embodiments, the method described in FIGS. 8-9 is performed by the server system (e.g., server system 320, FIG. 3).

In accordance with some embodiments, method 800 detects (block 802) a recommendation associated with a first user. The recommendation is associated with a respective good or service. In many embodiments, the recommendation recommends the associated good or service. In some embodiments, the server system 320 (FIG. 3) sends a recommendation to client system 302 (FIG. 3) or a content host 370 (FIG. 3), and thus detects the recommendation. For example, the server system 320 (FIG. 3) sends a recommendation, made by the first user, in a web page/presentation generated by user interface module 326 (FIG. 3) to client system 302 (FIG. 3), where the web page/presentation and the recommendation is viewed in client application 304 (FIG. 3) by a second user. In some embodiments, server system 320 (FIG. 3) sends the recommendation to client system 102 (FIG. 3) in a modality other than a web page (e.g., an email message, a text or chat message, in a dedicated application, etc.). In some embodiments, server system 320 (FIG. 3) sends a recommendation to client system 302 (FIG. 3) in response to a request (e.g., by the second user) for a recommendation, further details of which are described in U.S. patent application Ser. No. 13/769,181 filed Feb. 15, 2013, entitled "Trust Graph," which is incorporated by reference above.

As another example, server system 320 (FIG. 3) sends a recommendation to content host 370 (FIG. 3) for posting at content host 370 (FIG. 3) as a content item. Server system 320 (FIG. 3) sends the recommendation through an interface that communicates with content host 370 (FIG. 3). The recommendation is posted at content host 370 (FIG. 3) as a content item associated with a user account, at content host 370 (FIG. 3), of the first user (e.g., a social network, social network feed, blog, or message thread associated with or started by the first user). In some embodiments, server system 320 (FIG. 3) uses the login information for the first user's account at the content host 370 (FIG. 3), that is comprised in the contact information 712 (FIG. 7), to access the account at the content host and post the recommendation on the first user's behalf.

In some embodiments, server system 320 (FIG. 3) detects recommendations posted to content host 370 (FIG. 3) by the first user. Server system 320 (FIG. 3) accesses the first user's account at the content host and content items associated with the first user's account (e.g., content feed 372 (FIG. 3) of content items posted by the first user at content host 370 (FIG. 3)). Server system 320 (FIG. 3) receives the content items and determines whether any of the content items are recommendations (e.g., if the content item mentions a particular good or service, if the particular good or service is mentioned positively). Further details regarding determining recommendations in content items are described in U.S. patent application Ser. No. 14/673,413, filed Mar. 30, 2015, entitled "Systems and Methods for Recommendation Scraping," which is incorporated by reference herein in its entirety.

In some embodiments, the recommendation (of block 802) is detected in a content feed associated with the first user (block 810). For example, in some embodiments, the content feed can be a set of content items posted by the first user at content host 370 (FIG. 3). In some embodiments, the content feed can be one of: a social networking content feed associated with the first user, a blog associated with the first user, a microblog (e.g., TWITTER feed) associated with the first user, a message thread (or multiple message threads) associated with the first user, or an image (still image and/or video) collection associated with the first user (block 812).

In some embodiments, after detecting the recommendation (block 802), the server system detects (block 804) a response from a second user to the recommendation. For example, a recommendation, made by the first user, sent to the client system 302 (FIG. 3) by server system 320 (FIG. 3), server system 320 (FIG. 3) receives, and thus detects, a response (e.g., a reply or comment) to the recommendation. For example, the user at client system 302 (FIG. 3) replies to the recommendation from within the web page generated by user interface module 326 (FIG. 3) or through whichever modality the recommendation was sent to client system 302 (FIG. 3), and the reply is sent to server system 320 (FIG. 3).

In many embodiments, for a recommendation made by the first user and posted at content host 370 (FIG. 3), users that view the recommendation at content host 370 (FIG. 3) can respond to the recommendation. Server system 320 (FIG. 3) accesses the first user's account and the first user's recommendations at content host 370 (FIG. 3). Server system 320 (FIG. 3), with access to the first user's recommendations, also accesses any responses to those recommendations. Thus, when a second user responds to a recommendation by the first user, server system 320 (FIG. 3) accesses, and thus detects, the response.

In accordance with some embodiments, after detecting the response (block 804), the server system determines (block 806) whether the response from the second user comprises a purchase decision. In some embodiments, server system 320 (FIG. 3) analyzes the text of the response from the second user to the recommendation by the first user to determine if the response comprises a decision by the second user to purchase the recommended good or service. In some embodiments, server system 320 (FIG. 3) determines (block 814) whether the response comprises any of one or more predefined key words or phrases (e.g., "buy," "I want," "ship it," "purchase," "send me one"), and optionally excludes all of one or more predefined exclusion key words or phrases (e.g., "don't buy," "don't"). If server system 320 (FIG. 3) determines that the response comprises any of the key words or phrases, and optionally excludes all of the exclusion key words or phrases, server system 320 (FIG. 3) determines (block 816) that the response comprises a purchase decision. For example, if the response has the text "Buy," the response is determined to comprise a purchase decision. On the other hand, if the response has the text "Don't buy this. Not as good as it looks," the response is determined to not comprise a purchase decision; the response comprises the exclusion key phrase "don't buy."

In some embodiments, server system 320 (FIG. 3) determines (block 818) whether the response comprises a purchase decision using natural language processing. In some embodiments, using natural language processing, server system 320 (FIG. 3) determines whether the response text comprises a purchase decision.

In accordance with some embodiments, in accordance with a determination that the response from the second user comprises a purchase decision (block 806), the server system initiates (block 808) a transaction for the second user to purchase the respective good or service corresponding to the recommendation. When server system 320 (FIG. 3) determines that the response from the second user comprises a purchase decision, purchasing module 328 (FIG. 3) initiates the purchase transaction by the second user to purchase the recommended good or service. In many embodiments, purchasing module 328 (FIG. 3) identifies the good or service recommended in the recommendation and checks product database 340 (FIG. 3) to see if the good or service is in product database 340 (FIG. 3). If the good or service is in product database 340 (FIG. 3), purchasing module 328 (FIG. 3) chooses a vendor for the good or service, and retrieves (block 820) information required for the transaction from a user profile associated with the second user (e.g., the second user's profile in user profile database 350 (FIG. 3)). The retrieved information comprises, for example, sizing information (for clothing, etc.), payment information, and shipping information.

In some embodiments, method 800 further comprises, after retrieving the information, if the retrieved information is sufficient to proceed with the transaction, the server system proceeds (block 822) with the transaction using the retrieved information. If the retrieved information is not sufficient to proceed with the transaction, the server system prompt (block 824) the second user to provide missing information required for the transaction. If the information retrieved from the user profile is enough to complete the transaction, the server system proceeds with the transaction. If the user profile is missing some information that is required to complete the transaction (e.g., no shipping address, expired credit card), the server system prompts the second user to provide the information.

In some embodiments, the second user is a user that has yet to have a profile in server system 320 (FIG. 3). In some embodiments, server system 320 (FIG. 3) can generate a new profile associated with the second user in user profile database 350 (FIG. 3) and can prompt the second user for required information. The server system can populate the new profile with the information provided by the second user. Further information regarding prompting a user for required information is described in U.S. application Ser. No. 13/986,606, filed May 16, 2013, entitled "Progressively Asking for Increasing Amounts of User and Network Data," which is incorporated by reference above.

In some embodiments, server system 320 (FIG. 3) prompts the user for final confirmation or approval of the transaction before finalizing the transaction. When prompted, the user can give confirmation or approval of the transaction, edit details of the transaction (e.g., change shipping information, the quantity to be purchased, change payment information), or cancel the transaction. If the user cancels the transaction, server system 320 (FIG. 3) aborts the purchase transaction.

In some embodiments, server system 320 (FIG. 3) also can determine whether a response comprises a recipient (e.g., a gift recipient) of the item to be purchased in accordance with a purchase decision in the response. For example, the default recipient for a purchase decision is the user responding to the recommendation. Whenever the response does not comprise any indication of a possible alternate recipient (e.g., the response is "Buy,"), the default recipient is presumed for any purchase decision determined to be in the response. In some embodiments, if the response comprises an indication of a recipient other than the responding user (e.g., the response is "Buy for dad,"), when server system 320 (FIG. 3) determines that the response comprises a purchase decision, server system 320 (FIG. 3), when initiating the purchase transaction in accordance with the purchase decision, prompts the responding user with options for targeting the purchase to the alternate recipient, such as gift wrapping, direct shipping to the alternate recipient, and so on.

Figure 10:
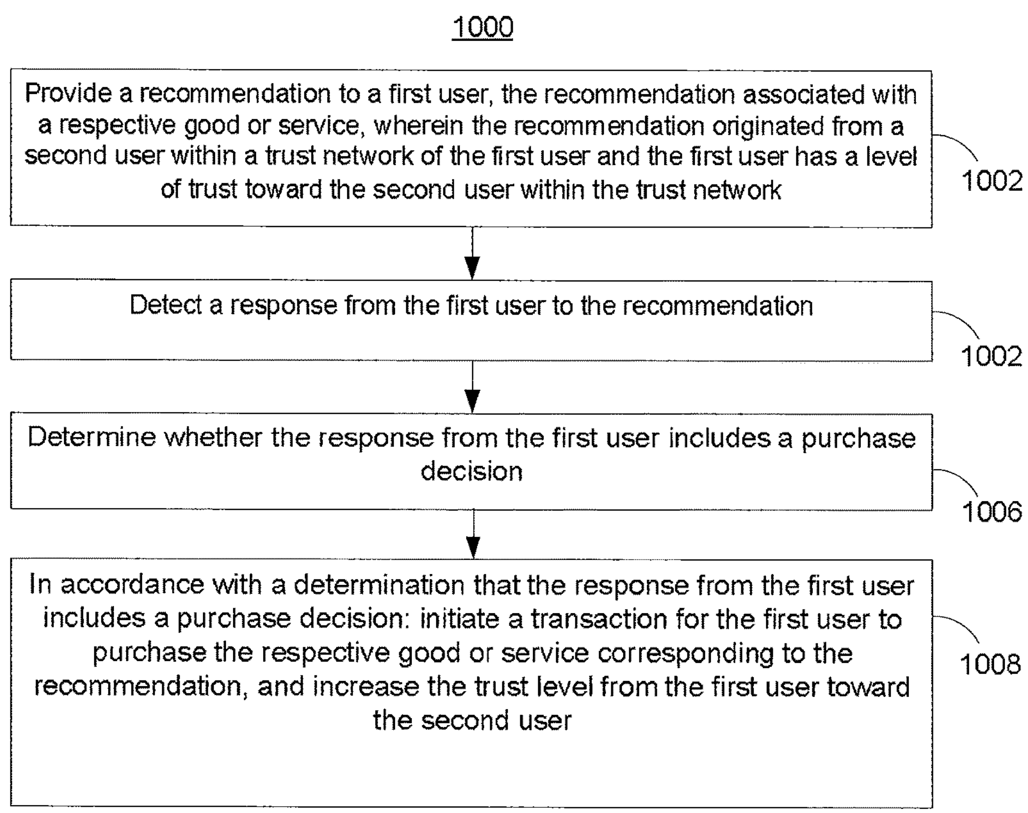
FIG. 10 is a flow diagram illustrating a process for initiating a purchase transaction in response to a reply to a recommendation, in accordance with some embodiments.

FIG. 10 is a flow diagram illustrating a method 1000 for initiating a purchase transaction in response to a reply to a recommendation, in accordance with some embodiments. In many embodiments, each of the operations shown in FIG. 10 can correspond to instructions stored in a computer memory or computer readable storage medium. Optional operations are indicated by dashed lines (e.g., boxes with dashed-line borders). In some embodiments, the method described in FIG. 10 is performed by the server system (server system 320, FIG. 3).

In some embodiments, method provides (block 1002) a recommendation to a first user. In some embodiments, the recommendation originated from a second user within a trust network of the first user, and the first user has a level of trust toward the second user within the trust network. In many embodiments, the recommendation can be associated with a respective good or service, and the recommendation recommends the associated good or service. In some embodiments, server system 320 (FIG. 3) provides a recommendation to the first user by posting the recommendation at content host 370 (FIG. 3) as a content item accessible by the first user using client system 302 (FIG. 3). In some embodiments, server system 320 (FIG. 3) provides the recommendation to the first user in a web page/presentation generated by user interface module 326 (FIG. 3) to client system 302 (FIG. 3), where the web page/presentation and the recommendation is viewed in client application 304 (FIG. 3) by the first user. In some embodiments, server system 320 (FIG. 3) sends the recommendation to client system 302 (FIG. 3) in a modality other than a web page (e.g., an email message, a text or chat message, in a dedicated application, etc.).

In some embodiments, server system 320 (FIG. 3) stores trust information for the first user and the second user, and thus can determine whether the first user and the second user are within each other's trust networks, and if so, a trust level from one user to the other. Server system 320 (FIG. 3) also can detect activities that affect the trust level (e.g., acting on or ignoring a recommendation, forwarding a recommendation, etc.)

In many embodiments, the recommendation provided by server system 320 (FIG. 3) is selected, from the first use's trust network, randomly or based at least in part on one or more criteria. The one or more criteria comprise, for example, how recent the recommendation is, a trust level of the first user to the user making the recommendation, etc.

In accordance with some embodiments, the method 1000 further comprises the server system detects (block 1004) a response from the first user to the recommendation. For a recommendation, made by the second user, sent to client system 302 (FIG. 3) by server system 320 (FIG. 3), server system 320 (FIG. 3) receives, and thus detects, a response (e.g., a reply or comment) to the recommendation. For example, the user at client system 302 (FIG. 3) replies to the recommendation from within the web page generated by user interface module 326 (FIG. 3)*or* through whichever modality the recommendation was sent to client system 302 (FIG. 3), and the reply is sent to server system 320 (FIG. 3).

In some embodiments, for a recommendation made by the second user and posted at content host 370 (FIG. 3), the first user, viewing the recommendation at content host 370 (FIG. 3), can respond to the recommendation. Server system 320 (FIG. 3) can access the first user's account and the first user's recommendations at content host 370. Server system 320 (FIG. 3), with access to the second user's recommendations, also can access any responses to those recommendations. Therefore, when the first user responds to the recommendation, server system 320 (FIG. 3) accesses, and thus detects, the response.

In some embodiments, method 1000 comprises the server system determines (block 1006) whether the response from the first user comprises a purchase decision. In some embodiments, server system 320 (FIG. 3) analyzes the text of the response from the first user using keyword analysis and/or natural language processing, as described above with reference to FIGS. 8-9, to determine if the response comprises a decision by the first user to purchase the recommended good or service.

In accordance with some embodiments, in accordance with a determination that the response from the first user comprises a purchase decision, the server system initiates a transaction for the first user to purchase the respective good or service corresponding to the recommendation, and increases the trust level from the first user toward the second user (block 1008). In some embodiments, when server system 320 (FIG. 3) determines that the response from the first user comprises a purchase decision, purchasing module 328 (FIG. 3) initiates a purchase transaction by the first user to purchase the recommended good or service. Purchasing module 328 (FIG. 3) identifies the good or service recommended in the recommendation and checks product database 340 (FIG. 3) to see if the good or service is in product database 340 (FIG. 3). If the good or service is in product database 340 (FIG. 3), the purchasing module chooses a vendor for the good or service, and retrieves (block 820, FIG. 9) information required for the transaction from a user profile associated with the first user (e.g., the first user's profile in user profile database 350, FIG. 3). The retrieved information comprises, for example, sizing information (for clothing, etc.), payment information, and shipping information.

In some embodiments, server system 320 (FIG. 3) also can increase the trust level from the first user toward the second user. The purchase decision by the first user evidences trust by the first user in the second user, and thus server system 320 (FIG. 3) increases the trust level (which is a valuation of trust from one user to another) from the first user toward the second user.

Although initiation of purchase transaction in response to a reply to a recommendation has been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the activities of FIGS. 8 and 9 may include different activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of improving efficiency of initiating online purchases from recommendations, the method comprising:

at a server environment computer system having one or more processors and non-transitory memory storing one or more programs for execution by at least one of the one or more processors, the server environment computer system comprising at least a server system, wherein the server system comprises a recommendation system, a purchasing system, and a software application ("app"), wherein the software app is coupled to the recommendation system and the purchasing system, the software app configured to be installed on a mobile device of a first user, wherein the software app comprises a first communication system and a first user interface, wherein the recommendation system is configured to access the recommendations from users stored within a trust network of the first user, wherein the trust network comprises one or more levels of trust that the first user has for each user on the trust network, wherein the recommendations are based on categories for products or services, and wherein the recommendation system is configured to retrieve the recommendations from a content host without activating a second user interface of the content host, wherein the content host comprises a second communication system configured to receive and send the recommendations from the users within the trust network of the first user;

receiving, by a third communication system (a) of the recommendation system and (b) coupled to the software app via the first communication system and (c) from the second communication system of the content host without activating the second user interface of the content host, one or more recommendations of the recommendations for the products or services by the first user posted to the content host, wherein the content host comprises a networking service, to permit the first user and other users having the first user within their respective trust networks, and also to permit further users having the other users within their respective trust networks, to (a) view a recommendation of the one or more recommendations posted by the first user via the content host, (b) provide a response to the recommendation posted by the first user via the content host by at least a reply, a comment, a like, an upvote, or a share, and (c) view the response to the recommendation posted by the other users or the further users, wherein:

the other users determine a respective trustworthiness of the first user who is within the respective trust networks of the other users, wherein the respective trust networks of the other users comprise one or more levels of trust the other users have for each user on the respective trust networks of the other users, wherein the recommendations are based on the categories for the products or services;

the further users determine a respective trustworthiness of the other users who are within the respective trust networks of the further users, wherein the respective trust networks of the further users comprise one or more levels of trust the further users have for each user on the respective trust networks of the further users, wherein the recommendations are based on the categories for the products or services; and a trustworthiness of the one or more recommendations by the first user for at least one of the further users is (a) the trustworthiness of the first user, as determined by at least one of the other users, multiplied by (b) the trustworthiness of the at least one of the other users, as determined by the at least one of the further users, such that the at least one of the other users is within a first level of the one or more levels of trust of the at least one of the further users, and such that the first user is within a second level of the one or more levels of trust of the at least one of the further users, and such that the first user is within a first level of the one or more levels of trust of the at least one of the other users;

detecting and receiving, by the recommendation system (a) coupled to the software app by the first communication system and (b) from the second communication system of the content host without activating the second user interface of the content host, a target response from a third user posted in reply to the recommendation from the first user, who is within a trust network of a second user, who is within a trust network of the third user, wherein the at least one of the further users comprises the third user and wherein the at least one of the other users comprises the second user;

determining, by the purchasing system, wherein the purchasing system comprises a fourth communication system coupled to the first communication system of the software app, whether the target response from the third user comprises a purchase decision regarding a desire to purchase a product or service, as recommended, by the first user via the content host, wherein the determining includes at least one of:

determining whether the target response comprises one or more predefined keywords;

determining whether the target response comprises one or more words from a set of words pre-determined by the third user to indicate the purchase decision; or using natural language processing; and in accordance with determining that the target response from the third user comprises the purchase decision:

initiating, by the purchasing system to increase an efficiency of a purchase transaction of an online purchase for the third user to purchase the product or service associated with the recommendation from the first user, including:

retrieving, by the purchasing system, information required for the purchase transaction from a user profile associated with the third user comprising payment information;

when the information is sufficient to proceed with the purchase transaction, the purchasing system is further configured to proceed with the purchase transaction using the information, as received;

when the information is not sufficient to proceed with the purchase transaction the purchasing system is further configured to prompt the third user to provide missing information required for the purchase transaction;

confirming, by the purchasing system, the purchase transaction with the third user before finalizing the purchase transaction, wherein, during the confirming, the purchasing system is further configured to permit the third user to (a) edit details of the purchase transaction or (b) cancel the purchase transaction; and when the third user has not canceled the purchase transaction during the confirming, identifying, by the purchasing system, a vendor listed in a vendor database that sells the product or service, to allow the third user to purchase the product or service through the purchasing system coupled to the software app; and increasing, by the recommendation system coupled to the software app, a trust level from the third user toward the second user within the trust network of the third user after completing the purchase transaction for the third user.

2. The method of claim 1, wherein the server system further comprises:

storing, using the recommendation system, in a recommendation database, the recommendations by the first user, the other users, and the further users, wherein a portion of the recommendations by the first user are retained for a pre-set period of time based on at least one of a date of the portion of the recommendations by the first user, the respective trustworthiness of the first user, the other users, and the further users, or a popularity of the recommendation by the first user.

3. The method of claim 2, wherein the server system further comprises:

storing in the recommendation database, responses to the recommendation of the first user determined to comprise purchase decisions by the other users and the further users for a pre-set period of time.

4. The method of claim 1 further comprising ranking multiple recommendations based on the respective trustworthiness of the first user, wherein the recommendation associated with the first user is one of the multiple recommendations.

5. The method of claim 1, wherein the server system further comprises:

storing, using the recommendation system, in a recommendation database, the recommendations by the first user, the other users, and the further users, wherein a portion of the recommendations by the first user are retained for a pre-set period of time based on at least one of a date of the portion of the recommendations by the first user, the respective trustworthiness of the first user, the other users, and the further users, or a popularity of the recommendation by the first user; and wherein the method further comprises:

ranking multiple recommendations based on the respective trustworthiness of the first user, wherein the recommendation associated with the first user is one of the multiple recommendations; and determining whether the response comprises one or more predefined keywords, text, emoticons, or images.

6. The method of claim 5, wherein the information further comprises:

data describing connections of the first user, the other users, and the further users;

trust levels comprising opinions and recommendations of the first user, the other users, and the further users; and an inferred trust information from an action of the first user, the other users, and the further users.

7. The method of claim 1, wherein the one or more recommendations of the recommendations for the products or services by the first user are posted to a content feed or collection of content items organized in chronological order.

8. A system, comprising:

an input device;

a video display;

one or more processors; and one or more non-transitory memory storage storing computer instructions configured to run on the one or more processors comprising at least a server system, comprising a recommendation system, a purchasing system, and a software application ("app"), wherein the software app is coupled to the recommendation system and the purchasing system, the software app configured to be installed on a mobile device of a first user, wherein the software app comprises a first communication system and a first user interface, wherein the recommendation system is configured to access recommendations from users stored within a trust network of the first user, wherein the trust network comprises one or more levels of trust that the first user has for each user on the trust network, wherein the recommendations are based on the categories for products or services, and wherein the recommendation system is configured to retrieve the recommendations from a content host without activating a second user interface of the content host, wherein the content host comprises a second communication system configured to receive and send the recommendations from the users within the trust network of the first user, wherein the computer instructions, when executed, cause to be performed:

receiving, by a third communication system (a) of the recommendation system and (b) coupled to the software app via the first communication system and (c) from the second communication system of the content host without activating the second user interface of the content host, one or more recommendations of the recommendations for the products or services by the first user posted to the content host, wherein the content host comprises a networking service to permit the first user, and other users having the first user within their respective trust networks, and also to permit further users having the other users within their respective trust networks, to (a) view a recommendation of the one or more recommendations posted by the first user via the content host, (b)

provide a response to the recommendation posted by the first user via the content host by at least a reply, a comment, a like, an upvote, or a share, and (c) view the response to the recommendation posted by the other users or the further users, wherein:

the other users determine a respective trustworthiness of the first user who is within the respective trust networks of the other users, wherein the respective trust networks of the other users comprise one or more levels of trust the other users have for each user on the respective trust networks of the other users, wherein the recommendations are based on the categories for the products or services;

the further users determine a respective trustworthiness of the other users who are within the respective trust networks of the further users, wherein the respective trust networks of the further users comprise one or more levels of trust the further users have for each user on the respective trust networks of the further users, wherein the recommendations are based on the categories for the products or services; and a trustworthiness of the one or more recommendations by the first user for at least one of the further users is (a) the trustworthiness of the first user, as determined by at least one of the other users, multiplied by (b) the trustworthiness of the at least one of the other users, as determined by the at least one of the further users, such that the at least one of the other users is within a first level of the one or more levels of trust of the at least one of the further users, and such that the first user is within a second level of the one or more levels of trust of the at least one of the further users, and such that the first user is within a first level of the one or more levels of trust of the at least one of the other users;

detecting and receiving, by the recommendation system (a) coupled to the software app by the first communication system and (b) from the second communication system of the content host without activating the second user interface of the content host, a target response from a third user posted in reply to the recommendation from the first user, who is within a trust network of a second user, who is within a trust network of the third user, wherein the at least one of the further users comprises the third user and wherein the at least one of the other users comprises the second user;

determining, by the purchasing system, wherein the purchasing system comprises a fourth communication system coupled to the first communication system of the software app, whether the target response from the third user comprises a purchase decision regarding a desire to purchase a product or service, as recommended, by the first user via the content host, wherein the determining includes at least one of:

determining whether the target response comprises one or more predefined keywords;

determining whether the target response comprises one or more words from a set of words pre-determined by the third user to indicate the purchase decision; or using natural language processing; and in accordance with determining that the target response from the third user comprises the purchase decision:

initiating, by the purchasing system to increase an efficiency of a purchase transaction of an online purchase for the third user to purchase the product or service associated with the recommendation from the first user, including:

retrieving, by the purchasing system, information required for the purchase transaction from a user profile associated with the third user comprising payment information;

when the information is sufficient to proceed with the purchase transaction, the purchasing system is configured to further proceed with the purchase transaction using the information, as received;

when the information is not sufficient to proceed with the purchase transaction the purchasing system is further configured to prompt the third user to provide missing information required for the purchase transaction;

confirming, by the purchasing system, the purchase transaction with the third user before finalizing the purchase transaction, wherein, during the confirming, the purchasing system is further configured to permit the third user to (a) edit details of the purchase transaction or (b) cancel the purchase transaction; and when the third user has not cancelled the purchase transaction during the confirming, identifying, by the purchasing system, a vendor listed in a vendor database that sells the product or service, to allow the third user to purchase the product or service through the purchasing system coupled to the software app; and increasing, by the recommendation system coupled to the software app, a trust level from the third user toward the second user within the trust network of the third user after completing the purchase transaction for the third user.

9. The system of claim 8, wherein the server system further comprises the computer instructions, when executed, cause to be performed:

storing, using the recommendation system in a recommendation database, the recommendations by the first user, the other users, and the further users, wherein a portion of the recommendations by the first user are retained for a pre-set period of time based on at least one of a date of the portion of the recommendations by the first user, the respective trustworthiness of the first user, the other users, and the further users, or a popularity of the recommendation by the first user.

10. The system of claim 9, wherein the server system further comprises:

storing in the recommendation database, responses to the recommendation of the first user determined to comprise purchase decisions by the other users and the further users for a pre-set period of time.

11. The system of claim 8, wherein the set of words comprises one or more predefined keywords, text, emoticons, or images.

12. The system of claim 8, further comprising ranking multiple recommendations based on the respective trustworthiness of the first user, wherein the recommendation associated with the first user is one of the multiple recommendations.

13. The system of claim 8 wherein the one or more non-transitory memory storage storing the computer instructions are further configured to run on the one or more processors and to rank multiple recommendations based on the respective trustworthiness of the first user, wherein the recommendation associated with the first user is one of the multiple recommendations.

14. The system of claim 8, wherein the server system further comprises:

storing in a recommendation database, the recommendations by the first user, the other users, and the further users, wherein a portion of the recommendations by the first user are retained for a pre-set period of time based on at least one of a date of the portion of the recommendations by the first user, the respective trustworthiness of the first user, the other users, and the further users, or a popularity of the recommendation by the first user; and wherein the computer instructions, when executed further cause to be performed:

determining whether the response comprises one or more predefined keywords, text, emoticons, or images; and to rank multiple recommendations based on the respective trustworthiness of the first user, wherein the recommendation associated with the first user is one of the multiple recommendations.

15. The system of claim 8, wherein the one or more recommendations of the recommendations for the products or services by the first user are posted to a content feed or collection of content items organized in chronological order.

16. A non-transitory computer readable storage medium storing one or more programs configured for execution by an electronic device, the one or more programs comprising instructions for:

receiving a software application ("app") coupled to a recommendation system and a purchasing system, the software app configured to be installed on a mobile device of a first user, wherein the software app comprises a first communication system and a first user interface, wherein the recommendation system is configured to access recommendations from users stored within a trust network of the first user, wherein the trust network comprises one or more levels of trust that the first user has for each user on the trust network, wherein the recommendations are based on the categories for products or services, and wherein the recommendation system is configured to retrieve the recommendations from a content host without activating a second user interface of the content host, wherein the content host comprises a second communication system configured to receive and send the recommendations from the users within the trust network of the first user;

receiving, by a third communication system (a) of the recommendation system and (b) coupled to the software app via the first communication system and (c) from the second communication system of the content host without activating the second user interface of the content host, one or more recommendations of the recommendations for the products or services by the first user posted to the content host, wherein the content host comprises a networking service to permit the first user and other users having the first user within their respective trust networks, and also to permit further users having the other users within their respective trust networks, to (a) view a recommendation of the one or more recommendations posted by the first user via the content host, (b) provide a response to the recommendation posted by the first user via the content host by at least a reply, a comment, a like, an upvote, or a share, and (c) view the response to the recommendation posted by the other users or the further users, wherein:

the other users determine a respective trustworthiness of the first user who is within the respective trust networks of the other users, wherein the respective trust networks of the other users comprise one or more levels of trust the other users have for each user on the respective trust networks of the other users, wherein the recommendations are based on the categories for the products or services;

the further users determine a respective trustworthiness of the other users who are within the respective trust networks of the further users, wherein the respective trust networks of the further users comprise one or more levels of trust the further users have for each user on the respective trust networks of the further users, wherein the recommendations are based on the categories for the products or services; and a trustworthiness of the one or more recommendations by the first user for at least one of the further users is (a) the trustworthiness of the first user, as determined by at least one of the other users, multiplied by (b) the trustworthiness of the at least one of the other users, as determined by the at least one of the further users, such that the at least one of the other users is within a first level of the one or more levels of trust of the at least one of the further users, and such that the first user is within a second level of the one or more levels of trust of the at least one of the further users, and such that the first user is within a first level of the one or more levels of trust of the at least one of the other users;

detecting and receiving, by the recommendation system (a) coupled to the software app by the first communication system and (b) from the second communication system of the content host without activating the second user interface of the content host, a target response from a third user posted in reply to the recommendation from the first user, who is within a trust network of a second user, who is within a trust network of the third user, wherein the at least one of the further users comprises the third user and wherein the at least one of the other users comprises the second user;

determining, by the purchasing system, wherein the purchasing system comprises a fourth communication system coupled to the first communication system of the software app, whether the target response from the third user comprises a purchase decision regarding a desire to purchase a product or service, as recommended by the first user via the content host, wherein the determining, includes at least one of:

determining whether the target response comprises one or more predefined keywords;

determining whether the target response comprises one or more words from a set of words pre-determined by the third user to indicate the purchase decision; or using natural language processing; and in accordance with determining that the target response from the third user comprises the purchase decision:

initiating, by the purchasing system to increase an efficiency of a purchase transaction of an online purchase for the third user to purchase the product or service associated with the recommendation from the first user, including:

retrieving, by the purchasing system, information required for the purchase transaction from a user profile associated with the third user comprising payment information;

when the information is sufficient to proceed with the purchase transaction, the purchasing system is further configured to proceed with the purchase transaction using the information, as received;

when the information is not sufficient to proceed with the purchase transaction the purchasing system is further configured to prompt the third user to provide missing information required for the purchase transaction; and confirming, by the purchasing system, the purchase transaction with the third user before finalizing the purchase transaction, wherein, during the confirming, the purchasing system is further configured to permit the third user to (a) edit details of the purchase transaction or (b) cancel the purchase transaction; and when the third user has not cancelled the purchase transaction during the confirming, identifying, by the purchasing system, a vendor listed in a vendor database that sells the product or service, to allow the third user to purchase the product or service through the purchasing system coupled to the software app; and increasing, by the recommendation system coupled to the software app, a trust level from the third user toward the second user within the trust network of the third user after completing the purchase transaction for the third user.

17. The non-transitory computer readable storage medium of claim 16, wherein the one or more programs further comprising instructions for:

storing in a recommendation database, the recommendations by the first user, the other users, and the further users, wherein a portion of the recommendations by the first user are retained for a pre-set period of time based on at least one of a date of the portion of the recommendations by the first user, the respective trustworthiness of the first user, the other users, and the further users, or a popularity of the recommendation by the first user.

18. The non-transitory computer readable storage medium of claim 17, wherein the one or more programs further comprising an instruction for:

storing in the recommendation database, responses to the recommendation of the first user determined to comprise purchase decisions by the other users and the further users for a pre-set period of time.

19. The non-transitory computer readable storage medium of claim 16, wherein the one or more programs further comprising instructions for:

storing in a recommendation database, the recommendations by the first user, the other users, and the further users, wherein a portion of the recommendations by the first user are retained for a pre-set period of time based on at least one of a date of the portion of the recommendations by the first user, the respective trustworthiness of the first user, the other users, and the further users, or a popularity of the recommendation by the first user; and wherein the one or more programs further comprise instructions for:

determining whether the response comprises one or more predefined keywords, text, emoticons, or images; and to rank multiple recommendations based on the respective trustworthiness of the first user, wherein the recommendation associated with the first user is one of the multiple recommendations.

20. The non-transitory computer readable storage medium of claim 16, wherein the one or more recommendations of the recommendations for the products or services by the first user are posted to a content feed or collection of content items organized in chronological order.

* * * * *